United States Patent
Lin et al.

(10) Patent No.: US 12,038,330 B2
(45) Date of Patent: Jul. 16, 2024

(54) POLARIMETER AND METHOD OF DETERMINING A STATE OF POLARIZATION OF AN INCOMING LIGHT BEAM

(71) Applicant: UNIVERSITE LAVAL, Québec (CA)

(72) Inventors: Zhongjin Lin, Quebec (CA); Wei Shi, Quebec (CA)

(73) Assignee: UNIVERSITÉ LAVAL, Québec (CA)

( * ) Notice: Subject to any disclaimer, the term of this patent is extended or adjusted under 35 U.S.C. 154(b) by 288 days.

(21) Appl. No.: 17/617,433

(22) PCT Filed: Jun. 8, 2020

(86) PCT No.: PCT/CA2020/050786
§ 371 (c)(1),
(2) Date: Dec. 8, 2021

(87) PCT Pub. No.: WO2020/248046
PCT Pub. Date: Dec. 17, 2020

(65) Prior Publication Data
US 2022/0228914 A1    Jul. 21, 2022

Related U.S. Application Data

(60) Provisional application No. 62/930,629, filed on Nov. 5, 2019, provisional application No. 62/859,827, filed on Jun. 11, 2019.

(51) Int. Cl.
*G01J 4/04* (2006.01)
*G02B 27/28* (2006.01)
(52) U.S. Cl.
CPC .............. *G01J 4/04* (2013.01); *G02B 27/283* (2013.01)

(58) Field of Classification Search
CPC .... G01J 4/04; G01J 4/00; G01J 1/0209; G01J 1/0425; G01J 1/0429; G01J 3/0218;
(Continued)

(56) References Cited

U.S. PATENT DOCUMENTS 7,206,069 B2    4/2007   Fuchs et al.
7,336,360 B2    2/2008   Oka et al.
(Continued)

FOREIGN PATENT DOCUMENTS

DE    102017216358 A1    3/2019
JP    2001050860          3/2004
(Continued)

OTHER PUBLICATIONS

Zhongjin Lin et al., "Chip-scale, full-Stokes polarimeter", Optics Express, Feb. 18, 2019 (18-020-2019), vol. 27, No. 4, pp. 4867-4877.
(Continued)

*Primary Examiner* — Tarifur R Chowdhury
*Assistant Examiner* — Carlos Perez-Guzman
(74) *Attorney, Agent, or Firm* — Reno Lessard; Norton Rose Fulbright Canada LLP

(57) ABSTRACT

There is described a polarimeter generally having a substrate; a polarization splitter on the substrate polarization splitting an incoming light beam into light beams; an interferometry circuit on the substrate forming polarization components from the light beams, and output waveguides outputting the polarization components. The interferometer circuit having a first power splitter splitting one of the light beams into first and second phase-retardant waveguides; a second power splitter splitting another one of the light beams into third and fourth phase-retardant waveguides being asymmetric with respect to the first and second phase-retardant waveguides; a first polarization coupler cou- (Continued)

pling the first and third phase-retardant waveguides to one another; and a second first polarization coupler polarization coupling the second and fourth phase-retardant waveguides to one another, in which intensities of the polarization components and an interferometry pattern of the interferometry circuit are indicative of a state of polarization of the incoming light beam.

27 Claims, 17 Drawing Sheets

(58) Field of Classification Search
CPC ...... G01J 3/0224; G01J 3/0256; G01J 3/4532; G01J 9/02; G01J 2009/023; G01J 2009/0261; G02B 27/283
See application file for complete search history.

(56) References Cited

U.S. PATENT DOCUMENTS

| | | | |
|---|---|---|---|
| 7,463,361 | B2 | 12/2008 | Fuchs et al. |
| 2006/0244973 | A1* | 11/2006 | Yun .................... G01B 9/02091 356/511 |
| 2007/0133005 | A1* | 6/2007 | Fuchs ...................... G01J 4/04 356/491 |
| 2016/0320170 | A1* | 11/2016 | Yun ...................... H01S 5/1025 |
| 2020/0209065 | A1* | 7/2020 | Baier ..................... G01N 21/21 |

FOREIGN PATENT DOCUMENTS

| | | |
|---|---|---|
| JP | 2017-133969 | 6/2020 |
| WO | 2017137646 A1 | 8/2017 |

OTHER PUBLICATIONS

Alba Espinosa-Soria et al., "Full Measurement of the Stokes Parameters Using a Subwavelength Silicon On-Chip Polarimeter", Advances in Science and Technology, Oct. 31, 2016, ISSN: 1662-0356, vol. 98, pp. 103-108.
Alba Espinosa-Soria et al., "On-Chip Optimal Stokes Nanopolarimetry Based on Spin-Orbit Interaction of Light", Nano Letters, Apr. 7, 2017, 17, pp. 3139-3144.
Hailong Zhou et al., "Silicon-based polarization analyzer by polarization-frequency mapping", APL Photonics 3, 106105 (2018); https://doi.org/10.1063/1.5044379, Aug. 27, 2018.
Hailong Zhou et al., "All-in-one silicon photonic polarization processor", Nanophotonics, Oct. 19, 2019; 8(12): 2257-2267, https://doi.org/10.1515/nanoph-2019-0310.
J. Scott Tyo et al., "Review of passive imaging polarimetry for remote sensing applications", Applied Optics, Aug. 1, 2006, vol. 45, No. 22, pp. 5453-5469.
Kazuhiko Oka et al., "Spectroscopic polarimetry with a channeled spectrum", Optics Letters, Nov. 1, 1999, vol. 24, No. 21, pp. 1475-1477.
Po Dong et al., "128-GB/s 100-km transmission with direct detection using silicon photonic Stokes vector receiver and I/Q modulator", Optical Society of America, Jun. 15, 2016, vol. 24, No. 13, DOI:10.1364/OE.24.014208 | Optics Express 14214.
Wenhao Wu et al., "Fully integrated CMOS-compatible polarization analyzer", De Gruyter, Nanophotonics 2019; aop.

* cited by examiner

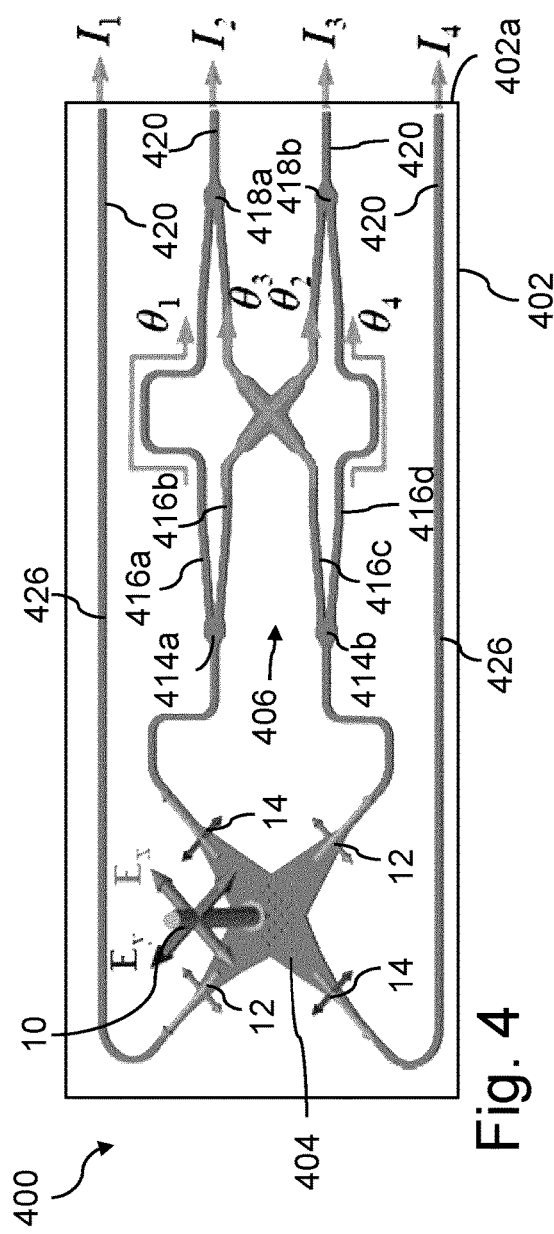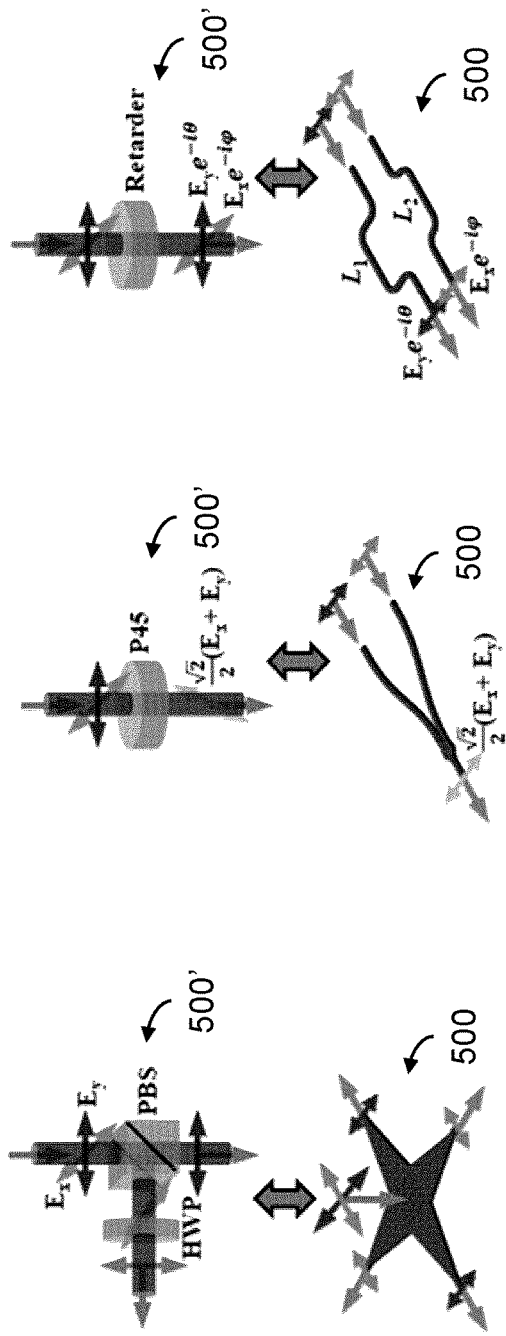
Fig. 4
Fig. 5A
Fig. 5B
Fig. 5C

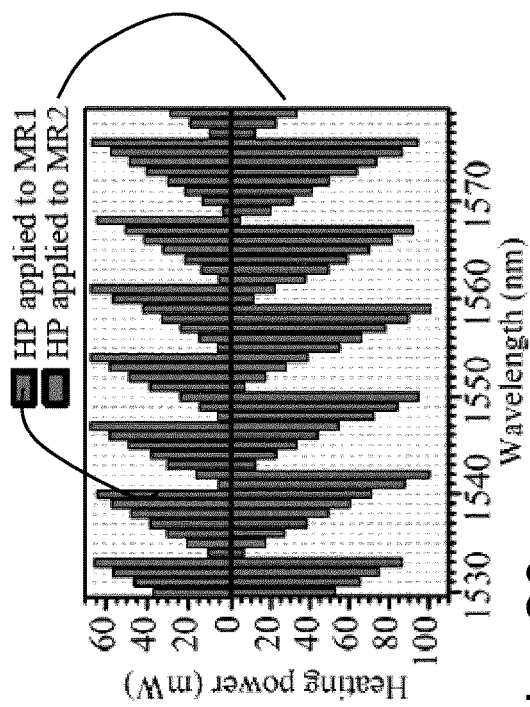
Fig. 23
Fig. 25
Fig. 24

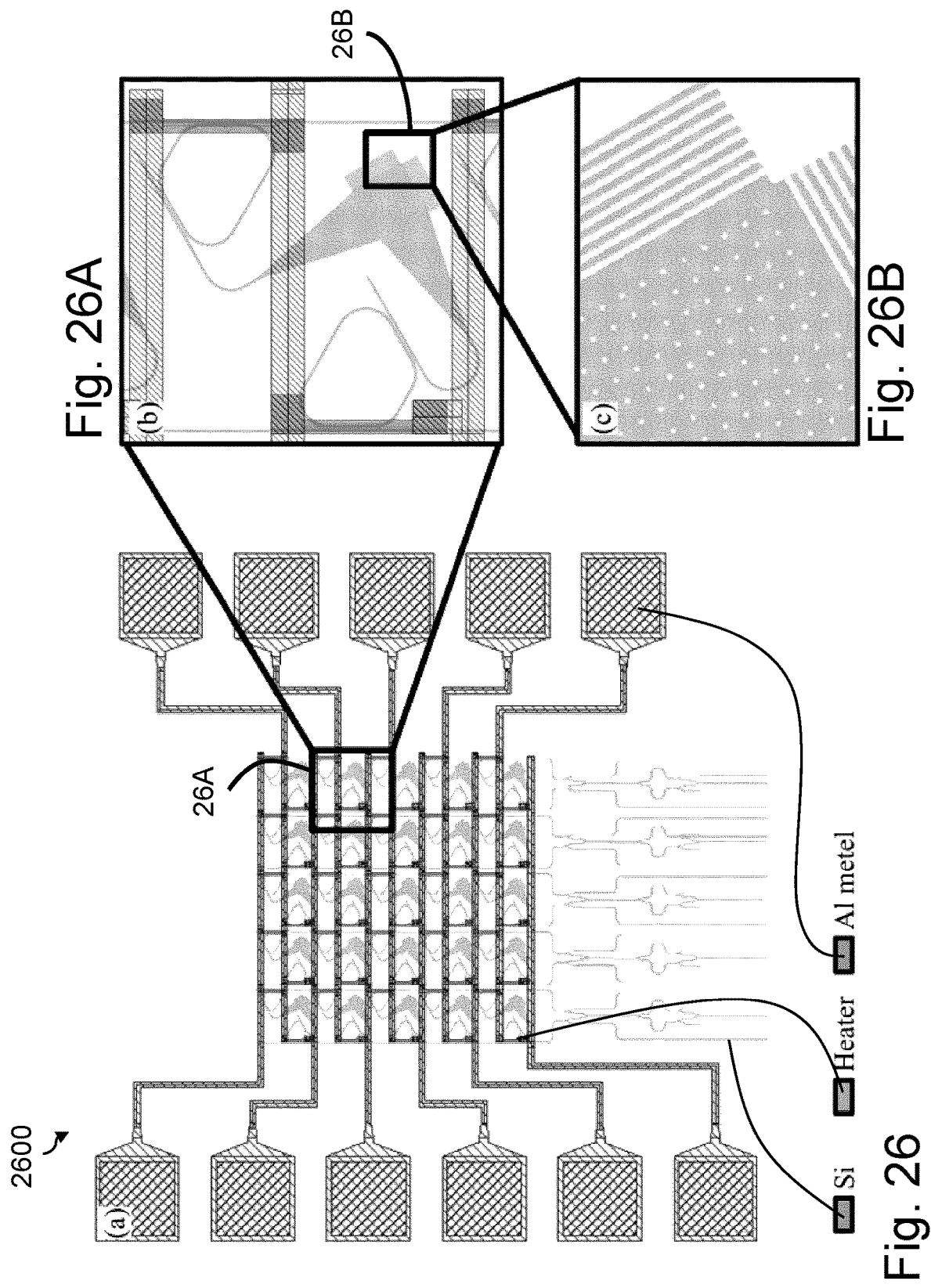

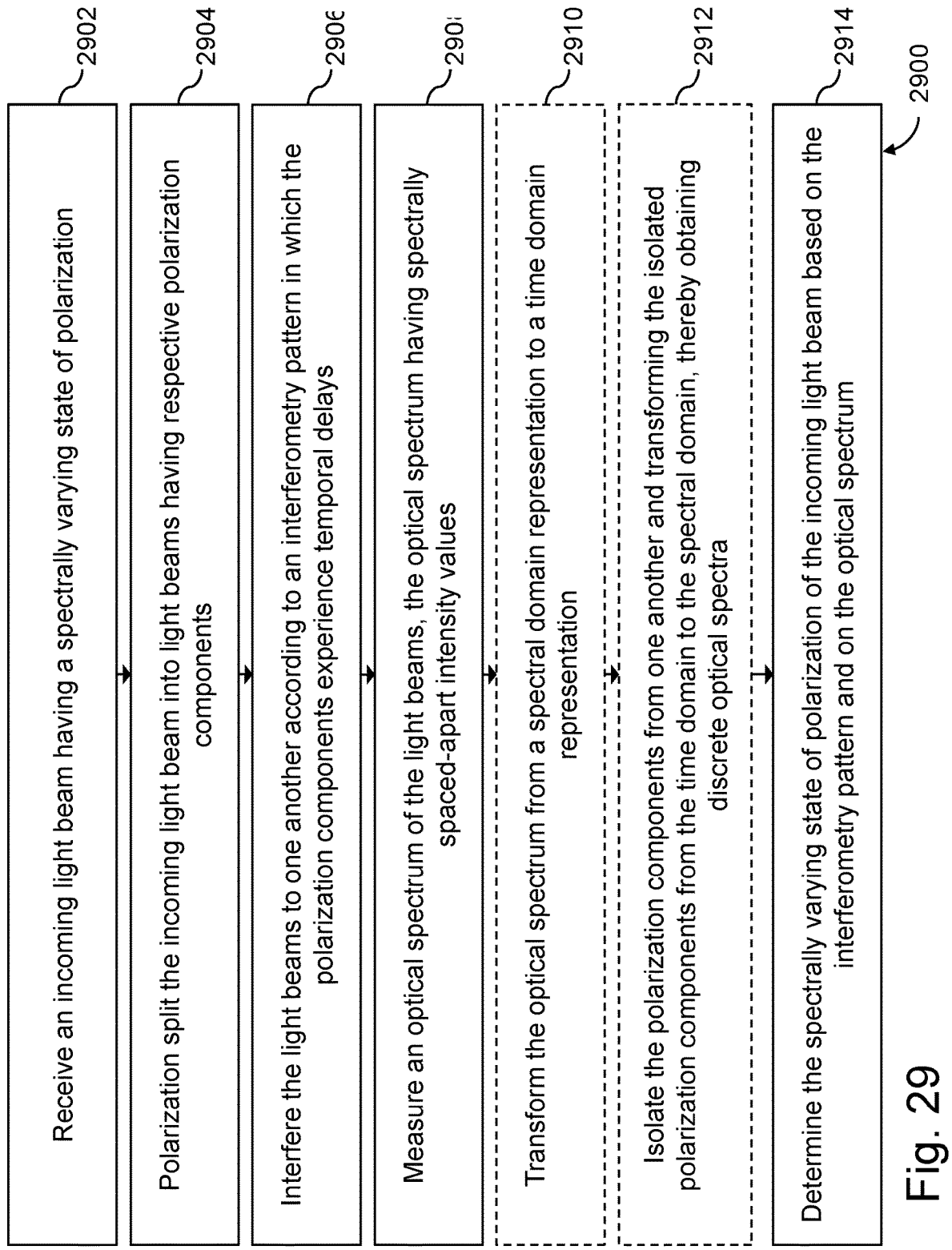

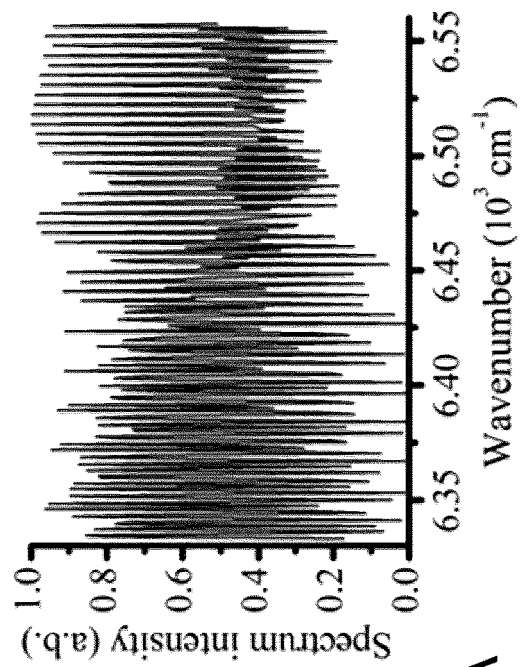
Fig. 30A
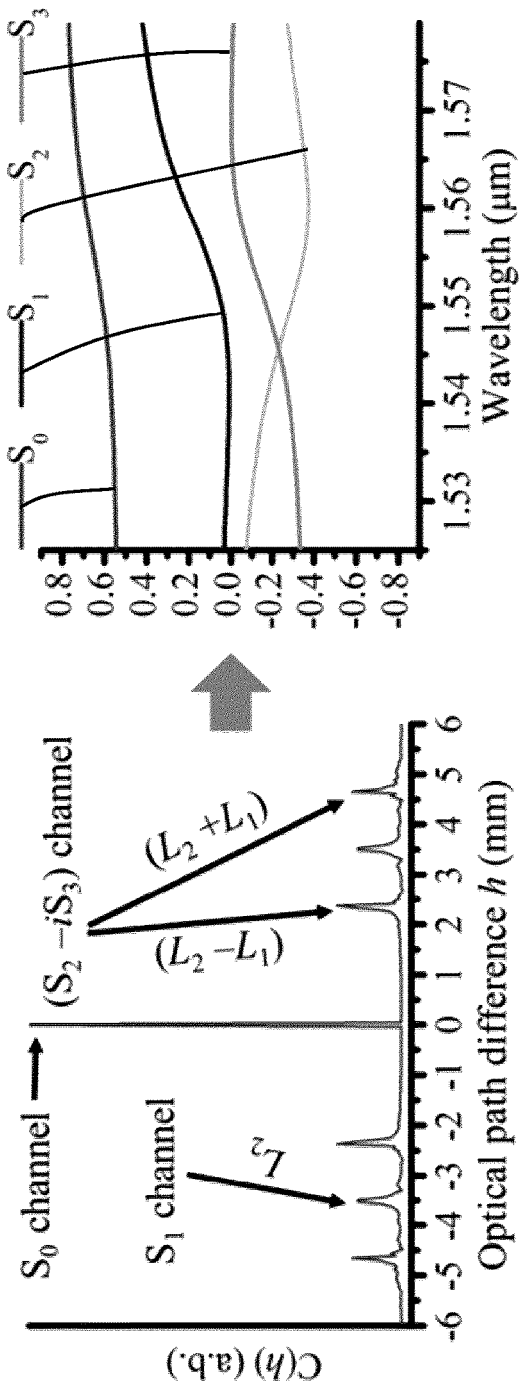
Fig. 30B
Fig. 30C

POLARIMETER AND METHOD OF DETERMINING A STATE OF POLARIZATION OF AN INCOMING LIGHT BEAM

FIELD

The improvements generally relate to polarimeters, i.e., optical polarization detectors, and more particularly to on-chip polarimeters.

BACKGROUND

Light beams consist of oscillating electric and magnetic fields which are always perpendicular to each other as they propagate along an axis.

Polarization generally refers to the shape that the fields make as they propagate towards an observer lying on the axis of propagation of the light beam. Knowing the state of polarization of a light beam can be of importance in a vast number of applications, such as quantum and classical communications, remote sensing, astronomy, and biomedical diagnostics. By convention, the types of polarization are determined by the electric field acting as a reference. For instance, a linear-type of polarization indicates that the electric field oscillates within a single orientation from the observer's point of view. In circular- or elliptical-types of polarization, the electric field rotates in a respective circular or elliptical shape. The rotation can have two possible directions which are recognizable using the right-hand rule. The light beam is right-rotationally-polarized if the direction of rotation of the electric field is related by the right-hand rule to the direction of propagation of the light beam. If the direction of rotation of the electric field is instead related by the left-hand rule to the direction of the propagation of the light beam, the light beam is left-rotationally-polarized.

Quantifying the state of polarization of an incoming light beam is generally performed using a polarimeter which can measure the relative importance of light beam portions behaving with any given types of polarization. In other words, the polarimeter divides the light beam into its main polarization components and measures them separately. Although existing polarimeters have been satisfactory to a certain degree, there remains room for improvement.

SUMMARY

It was found that there was a need in the industry for substrate-integrated polarimeters avoiding free-space propagation and components. In an aspect, there is described a substrate-based polarimeter having a polarization splitter, an interferometry circuit and output waveguides all received on a substrate. Such substrate-based polarimeter can significantly improve robustness while minimizing footprint and costs. Upon receiving an incoming light beam, the polarization splitter polarization splits the incoming light beam into at least a first light beam having a first polarization component and a second light beam having a second polarization component. For instance, the first light beam can be a first electric field component $E_x$ whereas the second light beam can be a second electric field component $E_y$ orthogonal to the first electric field component. Using the interferometry circuit, the first and second polarization components are interfered to one another to form first, second, third and fourth polarization components which can collectively fully define a state of polarization of the incoming light beam. To do so, the interferometry circuit has a first power splitter power splitting the first light beam into first and second phase-retardant waveguides, and a second power splitter power splitting the second light beam into third and fourth phase-retardant waveguides. The interferometry circuit has a first polarization coupler which polarization couples the first and third phase-retardant waveguides to one another forming a third polarization component, and a second first polarization coupler which polarization couples the second and fourth phase-retardant waveguides to one another forming a fourth polarization component. As the third and fourth phase-retardant waveguides are asymmetric with respect to the first and second phase-retardant waveguides, the third and fourth polarization components are complementary to one another. As such, the polarimeter has substrate-based output waveguides which each outputs a respective one of the so-split polarization components. Upon measuring intensities of the polarization components, and considering an interferometry pattern of the interferometry circuit, the state of polarization of the incoming light bam can be fully determined.

In accordance with a first aspect of the present disclosure, there is provided a polarimeter comprising: a substrate; a polarization splitter on said substrate receiving an incoming light beam and polarization splitting said incoming light beam into at least a first light beam having a first polarization component and a second light beam having a second polarization component; an interferometry circuit on said substrate having: a first power splitter power splitting said first light beam into first and second phase-retardant waveguides, and a second power splitter power splitting said second light beam into third and fourth phase-retardant waveguides being asymmetric with respect to said first and second phase-retardant waveguides; a first polarization coupler polarization coupling said first and third phase-retardant waveguides to one another forming a third polarization component, and a second first polarization coupler polarization coupling said second and fourth phase-retardant waveguides to one another forming a fourth polarization component; and a plurality of output waveguides outputting said polarization components, wherein intensities of said polarization components and an interferometry pattern of said interferometry circuit are indicative of a state of polarization of the incoming light beam.

Further in accordance with the first aspect of the present disclosure, the polarimeter can for example further comprise first, second, third and fourth detector units on said substrate each receiving a respective one of said polarization components, and generating a respective one of first, second, third and fourth signals indicative of said intensities.

Still further in accordance with the first aspect of the present disclosure, said first, second, third and fourth detector units can for example each have a photodetector on the substrate measuring an intensity of a given spectral component of the polarization components.

Still further in accordance with the first aspect of the present disclosure, the polarimeter can for example further comprise a controller communicatively coupled to said first, second, third and fourth detector units, said controller having a processor and a memory having stored thereon instructions that when executed by said processor perform the step of: determining the state of polarization of said incoming light beam based on said first, second, third and fourth signals and on said interferometry pattern.

Still further in accordance with the first aspect of the present disclosure, said determining can for example comprise determining a plurality of states of polarization each associated to a respective one of a plurality of spectral components of the incoming light beam.

Still further in accordance with the first aspect of the present disclosure, said first, second, third and fourth detector units can for example further have an optical spectrum analyzer measuring intensities of the plurality of spectral components of the polarization components.

Still further in accordance with the first aspect of the present disclosure, said optical spectrum analyzer can for example have a tunable filter being tunable to direct a given one of said spectral components towards a photodetector measuring an intensity of the selected one of said spectral components.

Still further in accordance with the first aspect of the present disclosure, said first, second, third and fourth phase-retardant waveguides can for example have corresponding subwavelength gratings.

Still further in accordance with the first aspect of the present disclosure, said first light beam can for example have a first electric field component and said second light beam has a second electric field component orthogonal to said first electric field component, said first, second, third and fourth polarization components being linear combinations of said first and second electric field components.

Still further in accordance with the first aspect of the present disclosure, said interferometry pattern can for example be indicative of said linear combinations.

Still further in accordance with the first aspect of the present disclosure, said first, second, third and fourth phase-retardants waveguides can for example have a respective one of first, second, third and fourth phase delays $\theta_1$, $\theta_2$, $\theta_3$, and $\theta_4$, at least said first and fourth phase delays $\theta_1$ and $\theta_4$ being different from one another.

Still further in accordance with the first aspect of the present disclosure, the intensity $I_1$ of said first polarization component can for example be indicative of an intensity of said first light beam, the intensity $I_2$ of said second polarization component is indicative of an intensity of said second light beam, the intensity $I_3$ denoting an intensity of said third polarization component, and the intensity $I_4$ denoting an intensity of said fourth polarization component.

Still further in accordance with the first aspect of the present disclosure, said interferometry pattern can for example be represented by a synthesis matrix $W_1$, wherein said state of polarization S of said incoming light beam is determinable using an equation proportional to the following equation:

$$S = W_1 \cdot I,$$

wherein S is a vector denoting said state of polarization $(S_0, S_1, S_2, S_3)^\tau$ of said incoming light beam, and I is a vector denoting said intensities $(I_1, I_2, I_3, I_4)^\tau$.

Still further in accordance with the first aspect of the present disclosure, the synthesis matrix $W_1$ can for example be given by a matrix equivalent to the following matrix:

$$W_1 = \frac{1}{8} \cdot \begin{pmatrix} 1 & 1 & 0 & 0 \\ 1 & 0 & \cos(\theta_1 - \theta_3) & -\sin(\theta_1 - \theta_3) \\ 1 & 0 & \cos(\theta_4 - \theta_2) & \sin(\theta_4 - \theta_2) \\ 1 & -1 & 0 & 0 \end{pmatrix}.$$

Still further in accordance with the first aspect of the present disclosure, said polarization splitter can for example have first and second splitter outputs each outputting said first light beam, and third and fourth splitter outputs each outputting said second light beam, one of said first and second splitter outputs being optically coupled to said first power splitter, one of third and fourth splitter outputs being optically coupled to said second power splitter.

Still further in accordance with the first aspect of the present disclosure, said interferometry circuit can for example have a first interferometry circuit, said polarimeter further comprising a second interferometry circuit on said substrate forming said first and second polarization components as a linear combination of said first and second light beams.

Still further in accordance with the first aspect of the present disclosure, the polarimeter can for example further comprise a first asymmetric power splitter power splitting said first light beam towards said first power splitter of said first interferometry circuit and a first power splitter of said second interferometry circuit, and a second asymmetric power splitter power splitting the second light beam towards said second power splitter of said first interferometry circuit and said second power splitter of said second interferometry circuit, the first and second asymmetric power splitters coupling towards the second interferometry circuit with a coupling factor PR and coupling towards the first interferometry circuit with a complementary coupling factor of PR'=1−PR.

Still further in accordance with the first aspect of the present disclosure, said interferometry pattern can for example be represented by a synthesis matrix $W_2$ equivalent to the following matrix:

$$W_2 = \begin{pmatrix} 1 & \frac{\tau-1}{\tau+1} & \frac{2\sqrt{\tau}\cos(\theta'_4 - \theta'_2)}{\tau+1} & \frac{-2\sqrt{\tau}\sin(\theta'_4 - \theta'_2)}{\tau+1} \\ 1 & \frac{\tau-1}{\tau+1} & \frac{2\sqrt{\tau}\cos(\theta'_1 - \theta'_3)}{\tau+1} & \frac{2\sqrt{\tau}\sin(\theta'_1 - \theta'_3)}{\tau+1} \\ 1 & \frac{1-\tau}{\tau+1} & \frac{2\sqrt{\tau}\cos(\theta'_1 - \theta'_3)}{\tau+1} & \frac{-2\sqrt{\tau}\sin(\theta'_1 - \theta'_3)}{\tau+1} \\ 1 & \frac{1-\tau}{\tau+1} & \frac{2\sqrt{\tau}\cos(\theta'_4 - \theta'_2)}{\tau+1} & \frac{2\sqrt{\tau}\sin(\theta'_4 - \theta'_2)}{\tau+1} \end{pmatrix},$$

wherein $\tau$ denotes PR/(1−PR).

Still further in accordance with the first aspect of the present disclosure, said first and second power splitters can for example have splitting ratios of about 50%.

Still further in accordance with the first aspect of the present disclosure, said output waveguides can for example run along said substrate towards a common area thereof.

Still further in accordance with the first aspect of the present disclosure, said polarization splitter can for example be a surface grating.

In accordance with a second aspect of the present disclosure, there is provided a method of determining a state of polarization of an incoming light beam, the method comprising: said incoming light beam impinging on a substrate having a polarization splitter; said polarization splitter polarization splitting said incoming light beam into at least a first light beam having a first polarization component and a second light beam having a second polarization component; propagating said first and second light beam across an interferometry circuit having waveguides running on said substrate; said interferometry circuit interfering said first and second light beams to one another in accordance with an interferometry pattern comprising asymmetrically phase-retarding said first and second light beams relative to one another to form third and fourth polarization components, said polarization components fully determining said state of polarization of said incoming light beam; simultaneously measuring intensities of said polarization components; and using a controller, determining said state of polarization based on said measured intensities and on said interferometry pattern.

Further in accordance with the second aspect of the present disclosure, said first light beam can for example have a first electric field component and said second light beam has a second electric field component orthogonal to said first electric field component, said first, second, third and fourth polarization components being linear combinations of said first and second electric field components.

In accordance with a third aspect of the present disclosure, there is provided a polarization imager comprising: a substrate, a plurality of the polarization splitters spaced-apart from one another on the substrate for receiving corresponding spaced-apart incoming light beams, the polarization splitters polarization splitting a respective one of said plurality of spaced-apart incoming light beams into at least a first light beam having a first polarization component and a second light beam having a second polarization component, a plurality of interferometry circuits optically coupled to one or more of the polarization splitters, said interferometry circuits interfering the first and second light beams to one another to form at least third and fourth polarization components, the polarization components fully defining a state of polarization of each of said spaced-apart incoming light beams, a plurality of output waveguides outputting said polarization components of said incoming light beams, wherein intensities of said polarization components and interferometry patterns of said interferometry circuits are indicative of said states of polarization of said incoming light beams.

Further in accordance with the third aspect of the present disclosure, each interferometry circuit can for example have an interferometry circuit on said substrate having: a first power splitter power splitting said first light beam into first and second phase-retardant waveguides, and a second power splitter power splitting said second light beam into third and fourth phase-retardant waveguides being asymmetric with respect to said first and second phase-retardant waveguides; a first polarization coupler polarization coupling said first and third phase-retardant waveguides to one another forming the third polarization component, and a second first polarization coupler polarization coupling said second and fourth phase-retardant waveguides to one another forming the fourth polarization component.

Still further in accordance with the third aspect of the present disclosure, the polarization imager can for example further comprise detector units on said substrate each receiving a respective one of said polarization components of said incoming light beams, and generating a respective one of first, second, third and fourth signals indicative of said intensities.

Still further in accordance with the third aspect of the present disclosure, the polarization imager can for example further comprise a controller communicatively coupled to said first, second, third and fourth detector units, said controller having a processor and a memory having stored thereon instructions that when executed by said processor perform the step of: determining the states of polarization of said incoming light beams based on said first, second, third and fourth signals and on said interferometry pattern, and generating a polarization image based on said states of polarization.

In accordance with a fourth aspect of the present disclosure, there is provided a polarimeter comprising: a substrate; a polarization splitter on said substrate receiving an incoming light beam having a given state of polarization and polarization splitting said incoming light beam into at least a first light beam having a first polarization component and a second light beam having a second polarization component; an interferometry circuit on said substrate having first and second phase-retardant waveguides receiving a respective one of said first and second polarization components, a multimode interference coupler coupling the and second polarization components to one another and splitting the polarization components towards third and fourth phase-retardant waveguides, and a multimode coupler coupling the third and fourth phase-retardant waveguides to one another, thereby forming third and fourth polarization components based on interference of the first and second polarization components, with at least the first and third phase-retardant waveguides being asymmetric with respect to one another; an output waveguide outputting the polarization components, wherein intensities of said polarization components and an interferometry pattern of said interferometry circuit are indicative of a spectrally-resolved state of polarization of the incoming light beam.

Further in accordance with the fourth aspect of the present disclosure, the polarimeter can for example further comprise an optical spectrum analyzer optically coupled to the output waveguide and measuring intensities of the polarization components at a plurality of spectral components.

Still further in accordance with the fourth aspect of the present disclosure, the polarimeter can for example further comprise a controller communicatively coupled to said optical spectrum analyzer, said controller having a processor and a memory having stored thereon instructions that when executed by said processor perform the step of: determining the spectrally-resolved state of polarization of said incoming light beam based on the measured intensities and on said interferometry pattern.

In accordance with a fifth aspect of the present disclosure, there is provided a method of performing a spectroscopic polarimetry measurement, the method comprising: receiving an incoming light beam having a spectrally varying state of polarization; polarization splitting the incoming light beam into a plurality of light beams having respective polarization components; interfering the plurality of light beams to one another according to an interferometry pattern in which said respective polarization components experience respective temporal delays; measuring an optical spectrum of the plurality of light beams, the optical spectrum having spectrally spaced-apart intensity values; and determining the spectrally varying state of polarization of the incoming light beam based on the interferometry pattern and on the measured optical spectrum.

Further in accordance with the fifth aspect of the present disclosure, the method can for example further comprise transforming the optical spectrum from a spectral domain representation to a time domain representation, thereby obtaining temporally spaced-apart intensity values showing the polarization components at corresponding temporal delays.

Still further in accordance with the fifth aspect of the present disclosure, the method can for example further comprise isolating the polarization components from one another and transforming the so-isolated polarization components from the time domain to the spectral domain, thereby obtaining discrete optical spectra associated to the polarization components.

Still further in accordance with the fifth aspect of the present disclosure, said transforming the optical spectrum from a spectral domain representation to a time domain representation can for example include performing an inverse Fourier transform of the optical spectrum.

Still further in accordance with the fifth aspect of the present disclosure, said transforming the so-isolated polarization components from the time domain to the spectral domain can for example include performing a Fourier transform of the so-isolated polarization components.

In accordance with a sixth aspect of the present disclosure, there is provided a polarimeter comprising: a substrate; a polarization splitter on said substrate receiving an incoming light beam and polarization splitting said incoming light beam into at least a first light beam having a first polarization component and a second light beam having a second polarization component; an interferometry circuit on said substrate and interfering the first and second light beams to one another thereby forming third and fourth polarization components, the polarization components fully defining a state of polarization of the incoming light beam; a plurality of output waveguides outputting said polarization components; and an optical spectrum analyzer on said substrate, the optical spectrum analyzer being optically coupled to the plurality of output waveguides and measuring intensities of a plurality of spectral components for the polarization components, the measured intensities being indicative of a spectrally-resolved state of polarization of the incoming light beam.

Many further features and combinations thereof concerning the present improvements will appear to those skilled in the art following a reading of the instant disclosure.

DESCRIPTION OF THE FIGURES

In the figures,

FIG. 4 is a schematic view of a second example of a substrate-mounted polarimeter, with $\theta_1$, $\theta_2$, $\theta_3$, and $\theta_4$ denoting phase delays of each phase-retardant waveguides and $I_1$, $I_2$, $I_3$, and $I_4$ denoting intensities at each waveguide output, in accordance with one or more embodiments;

FIG. 5A shows an oblique view of an example of a substrate-based polarization splitter shown in contrast to its free-space counterpart, in accordance with one or more embodiments;

FIG. 5B shows an oblique view of an example of a substrate-based polarization coupler splitter shown in contrast to its free-space counterpart, in accordance with one or more embodiments;

FIG. 5C shows an oblique view of an example of a substrate-based phase-retardant waveguides shown in contrast to its free-space counterpart, in accordance with one or more embodiments;

FIG. 23 is a graph of a spectrum of heating power used to operate the tunable filters of FIG. 22, in accordance with one or more embodiments;

FIG. 24 is a graph showing a spectrum of photocurrent representing another transmission spectrum of a drop port of the tunable filter of FIG. 22, in accordance with one or more embodiments;

FIG. 25 is a graph showing a spectrum of photocurrent representing a transmission spectrum of the drop port of the serially coupled double microring resonator of FIG. 34E, in accordance with one or more embodiments;

FIG. 26 is a schematic view of an example of a substrate-based polarization imager incorporating a plurality of polarimeters acting each acting as a corresponding pixel element, in accordance with one or more embodiments;

FIG. 26A is an enlarged view of the polarization imager of FIG. 26 showing inset 26A of FIG. 26, in accordance with one or more embodiments;

FIG. 26B is an enlarged view of the polarization imager of FIG. 26 showing inset 26B of FIG. 26, in accordance with one or more embodiments;

FIG. 29 is a flow chart of an example of a method of performing a spectroscopic polarimetry measurement, in accordance with one or more embodiments;

FIG. 30A is an example of an optical spectrum showing spectrally spaced-apart intensity values, in accordance with one or more embodiments;

FIG. 30B is an example of a time domain representation of the optical spectrum of FIG. 30A, in accordance with one or more embodiments; and FIG. 30C is a graph showing exemplary discrete optical spectra associated with different polarization components, in accordance with one or more embodiments.

DETAILED DESCRIPTION

Figure 1:
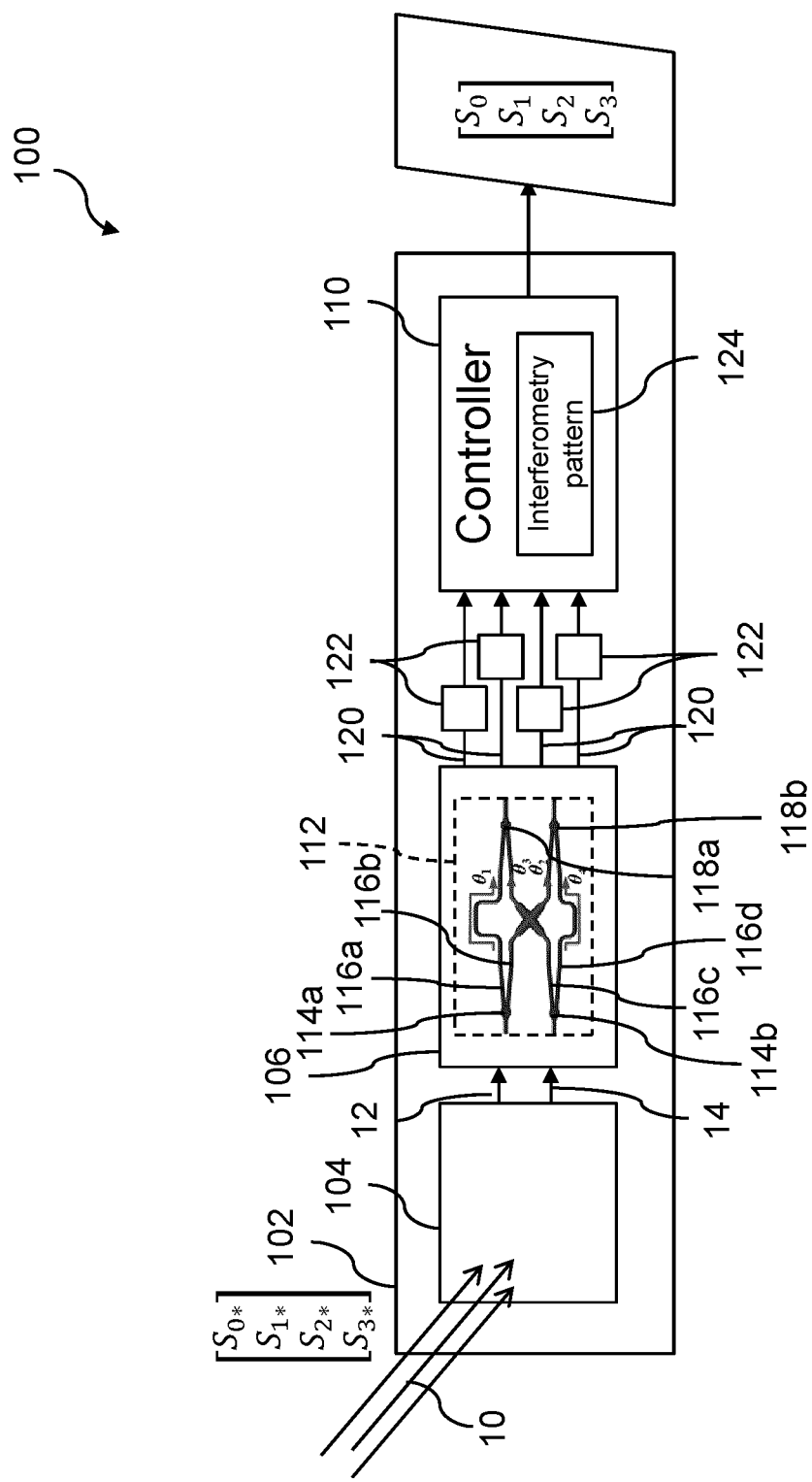
FIG. 1 is a schematic view of a first example of a substrate-mounted polarimeter, showing a polarization splitter, an interferometry circuit, detector units and a controller, in accordance with one or more embodiments.

FIG. 1 shows a first example of a polarimeter 100 in accordance with the present disclosure. As depicted, the polarimeter 100 is substrate-based. In other words, the polarimeter 100 has different optical components optically coupled to one another on a substrate 102. For instance, the optical components can be permanently fixed, integrated, stacked, deposited or otherwise supported on the substrate 102. The substrate 102 can be formed of various materials such as those generally used in photonic-integrated circuits (PICs). Examples of such materials include, but are not limited to, indium phosphide, silicon, silicon nitride, and germanium, with waveguides guiding light from the visible to long-wave-infrared regions of the electromagnetic spectrum. More specifically, the optical components can include, but not limited to, a polarization splitter 104, an interferometry circuit 106, detector units 108, and a controller 110 in this specific embodiment. As will be described below, the polarimeter 1000 receives an incoming light beam 10 having an unknown state of polarization $[S_0^*, S_1^*, S_2^*, S_3^*]$ and then process the incoming light beam 10 so as to determine its given state of polarization $[S_0, S_1, S_2, S_3]$.

As illustrated, the polarimeter 100 has a polarization splitter 104 on the substrate 102. The polarization splitter 104 receives the incoming light beam 10 and polarization splits it into at least a first light beam 12 having a first polarization component and a second light beam 14 having a second polarization component.

The polarimeter 100 has an interferometry circuit 106 which is optically coupled to the polarization splitter 104. The interferometry circuit 106 receives the first and second light beams 12 and 14 from the polarization splitter 104. Once received, the interferometry circuit 106 performs interference between the first and second light beams 12 and 14 in accordance with an interferometry pattern 112 thereby yielding four separate polarization components fully defining the state of polarization $[S_0, S_1, S_2, S_3]$ of the incoming light beam 10.

More specifically, the interferometry circuit 106 has a first power splitter 114a which power splits the first light beam 12 into first and second phase-retardant waveguides 116a and 116b, and a second power splitter 114b which power splits the second light beam 14 into third and fourth phase-retardant waveguides 116c and 116d. The first and second power splitters 114a and 114b can have splitting ratios of about 50% in this example. The interferometry circuit 106 has a first polarization coupler 118a which polarization couples the first and third phase-retardant waveguides 116a and 116c to one another forming a third polarization component, and a second first polarization coupler 118b which polarization couples the second and fourth phase-retardant waveguides 116b and 116d to one another forming a fourth polarization component. As shown, the third and fourth phase-retardant waveguides 116c and 116d are asymmetric with respect to the first and second phase-retardant waveguides 116a and 116b. Thanks to the asymmetry between these two pairs of phase-retardant waveguides, the third and fourth polarization components are two different linear combinations of the first and second polarization components thereby fully defining the state of polarization $[S_0, S_1, S_2, S_3]$ of the incoming light beam 10.

As such, the polarimeter 110 has output waveguides 120 which are optically coupled to the interferometry circuit 106 thereby outputting the polarization components. As will be discussed below, intensities of the polarization components are indicative of the state of polarization of the incoming light beam 10 when processed with knowledge of the interferometry pattern 112 of the interferometry circuit 106.

In this specific example, the polarimeter 100 has first, second, third and fourth detector units 122 on the substrate 102. Each of the detector units 122 receives a respective one of the polarization components outputted by the output waveguides 120, and generates a respective one of first, second, third and fourth signals which are indicative of the intensities of the polarization components. It is noted that although the detector units 122 are shown on the substrate 102 in this example, the detector units 122 need not to be on the substrate 102. In some embodiments, the detector units 122 are optically coupled to the output waveguides 120 without being on the substrate 102. For instance, the output waveguides 120 may lead to edge couplers to which the detector units 122 are optically coupled. In these embodiments, the output waveguides 120 may run along the substrate towards a common area thereof, e.g., towards the edge couplers or any other type of output components. However, in some other embodiments, the detector units 122 may not share a common area of the substrate 102. As such, the detector units 122 can be remote from the substrate 102 in at least some embodiments.

Still referring to FIG. 1, the polarimeter 100 has a substrate-based controller 110 which is communicatively coupled to the detector units 122. The controller 110 has a processor and a non-transitory memory having stored thereon instructions that when executed by the processor can determine the state of polarization $[S_0,S_1,S_2,S_3]$ of the incoming light beam 10 based on the first, second, third and fourth signals and on the interferometry pattern 112 of the interferometry circuit 106. As schematically shown in this example, information 124 relating to the interferometry pattern 112 can be stored on a memory of the controller 110 for use in determining the state of polarization $[S_0,S_1,S_2,S_3]$ of the incoming light beam 10 based on the measured intensities. The controller 110 needs not to be on the substrate 102. In some embodiments, the controller 110 is remote from the substrate 102 in some embodiments.

Figure 2:
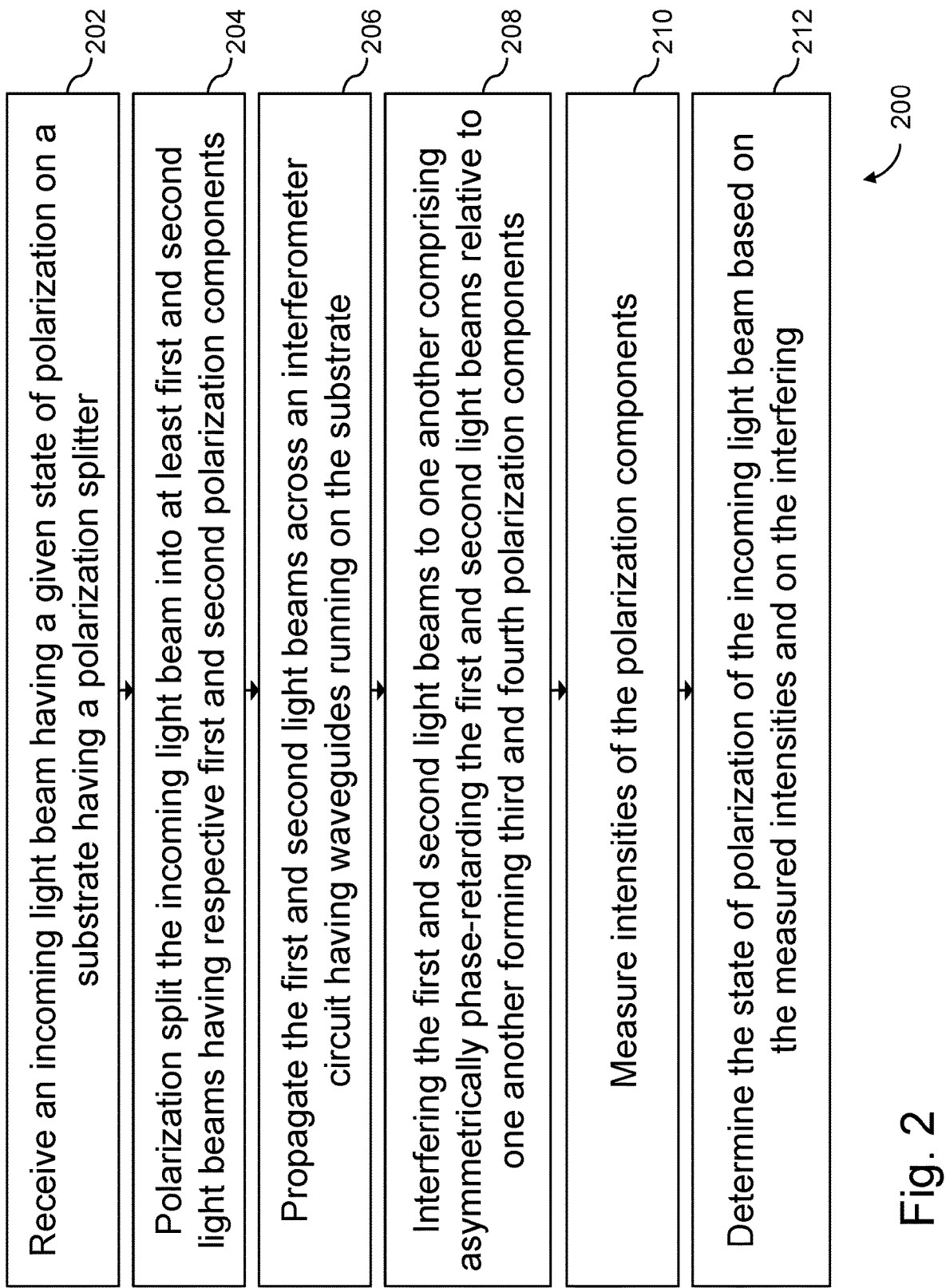
FIG. 2 is a flow chart of an example of a method for determining a state of polarization of an incoming light beam, in accordance with one or more embodiments.

Reference is now made to FIG. 2 which shows a flow chart of a method 200 of determining a state of polarization of an incoming light beam.

At step 202, an incoming light beam having a given state of polarization is received on a substrate-based polarization splitter.

In some embodiments, the polarization splitter is provided in the form of a surface grating with two, four or more splitter outputs. In these embodiments, the incoming light beam generally impinges obliquely or vertically relative to the substrate. In some other embodiments, the polarization splitter is provided in the form of an assembly comprising an edge coupler and a polarization splitter rotator. In such embodiments, the incoming light beam is substantially parallel to a surface of the substrate as it impinges on the edge coupler. The polarization splitter rotator can have different waveguide structures. For example, in some embodiments, the polarization splitter rotator has an input waveguide receiving incoming light which is decomposed into the fundamental quasi-transverse-electric ($TE_0$) mode and the fundamental quasi-transverse-magnetic ($TM_0$) mode. The polarization splitter rotator then propagates these modes through an asymmetric optical coupler that supports hybrid-polarization modes. The asymmetric optical coupler couples the $TM_0$ mode to another waveguide and converts it into the $TE_0$ mode simultaneously. In some other embodiments, the $TE_0$ mode and the $TM_0$ mode are propagated through a multi-mode hybrid-polarization waveguide followed by an asymmetric optical coupler. The multi-mode hybrid-polarization waveguide converts the $TM_0$ mode into the second-order quasi-transverse-electric mode ($TE_1$), while the asymmetric optical coupler couples the $TE_1$ mode to the $TE_0$ mode in another waveguide, thereby polarization splitting the incoming light beam. Other types of polarization splitter can be used as well, e.g., using nanoparticles or dielectric structures that have polarization-dependent responses.

At step 204, the substrate-based polarization splitter polarization splits the incoming light beam into at least a first light beam having a first polarization component and a second light beam having a second polarization component.

In some embodiments, the first and second polarization components can be orthogonal to one another. In these embodiments, the first polarization component can be polarized in a 0° or horizontal linear polarization whereas the second polarization component can be polarized in a 90° or vertical linear polarization. Similarly, the first polarization component can consist of a first electric field component Ex whereas the second polarization component can consist of a second electric field component Ey orthogonal to the first electric field component Ey.

As discussed above, the polarization splitter can have a number of splitter outputs outputting the first and second light beams split from the incoming light beam. In some embodiments, the polarization splitter has four splitter outputs wherein two of the splitter outputs output the first light beam and the other two of the splitter outputs output the second light beam. In some embodiments, the polarization has two splitter outputs each outputting a respective one of the first and second light beams. Examples of polarimeters having such two- or four-way polarization splitters are described below.

At step 206, the first and second light beams are propagated across a substrate-based interferometry circuit having waveguides running on a substrate.

In embodiments having four-way polarization splitters, two of the splitter outputs propagating the first and second light beams can lead directly to respective output waveguides without much interfering. In these embodiments, the first and second polarization components consist of the first and second light beams, respectively. The other two of the splitter outputs lead to the interferometry circuit where the first and second light beams are interfered with one another to form the third and fourth polarization components. In embodiments having two-way polarization splitters, the first and second light beams can be interfered using more than one interferometry circuits to provide four different polarization components fully defining the state of polarization of the incoming light beam.

At step 208, the first and second light beams are interfered with one another in accordance with an interferometry pattern which includes asymmetrically phase-retarding the first and second light beams relative to one another thereby forming additional polarization components.

In this step, should the first and second light beams be interfered with one another in accordance with a symmetric interferometry pattern, the third and fourth polarization components would be equivalent to one another, which would only partially define the state of polarization of the incoming light beam. By incorporating an asymmetric interferometry pattern, the step 208 ensures that the first and second light beams are interfered with one another in a way that the third and fourth polarization components bear different aspects of the state of polarization of the incoming light beam. Accordingly, the state of polarization of the incoming light beam can be fully determined by the first, second, third and fourth polarization components.

At step 210, intensities of the polarization components are measured. The measured intensity can be the peak intensity of the corresponding signal in some embodiments, whereas the measured intensity can be the area under the curve of the corresponding signal in some other embodiments. The intensities can be measured using respective photodetectors such as photodiodes (PDs) optically coupled with corresponding waveguide outputs and measuring intensities of the corresponding polarization components. In these embodiments, the photodetectors may measure the intensity within a given monochromatic spectral band. As such, the state of polarization of the incoming light beam may be associated with only one spectral component or band. However, in some other embodiments, the detector units may have an optical spectrum analyzer measuring intensities at a plurality of spectral components for each of the polarization components. In these embodiments, the state of polarization of the incoming light beam may include a plurality of states of polarization each associated with a respective one of the spectral components of the incoming light beam. In other words, depending on the construction of the detector units, the polarimeter can be a spectropolarimeter determining a spectrally-resolved state of polarization of the incoming light beam.

At step 212, the state of polarization of the incoming light beam is determined based on the measured intensities and on the interferometry pattern of step 208.

As mentioned above, the first light beam can have a first electric field component whereas the second light beam can have a second electric field component orthogonal to the first electric field component. In these embodiments, the first, second, third and fourth polarization components can be linear combinations of the first and second electric field components. The interferometry pattern is thereby indicative of these linear combinations. For instance, let S denote the state of polarization $(S_0, S_1, S_2, S_3)^\tau$ of the incoming light beam, with $S_0, S_1, S_2,$ and $S_3$ representing the Stokes parameters, i.e., a typical way of quantifying any given state of polarization, I denote the intensities $(I_1, I_2, I_3, I_4)^\tau$ of the first, second, third and fourth polarization components which are measured using the detector units, and W denotes a matrix representative of the interferometry pattern. The state of polarization S of the incoming light beam can be determined using an equation equivalent to the following equation:

$$S \propto W \cdot I. \quad (1)$$

Accordingly, with knowledge of the interferometry pattern of the interferometry circuit, represented by the matrix W, one can retrieve the state of polarization of the incoming light beam on the basis of the measured intensities $(I_1, I_2, I_3, I_4)^\tau$. Other examples of the matrix W are described below.

Figure 3:
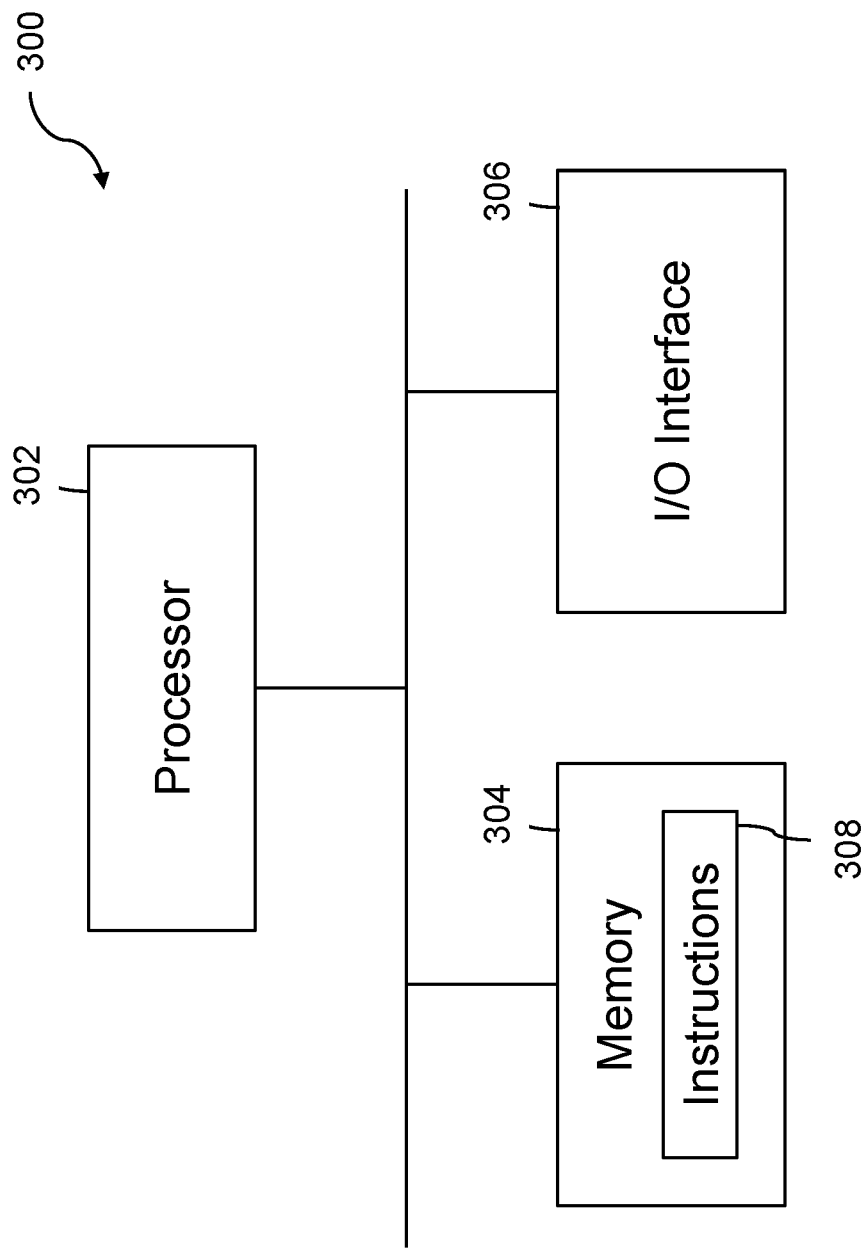
FIG. 3 is a schematic view of an example of a computing device of the controller of FIG. 1, in accordance with one or more embodiments.

The computations performed to determine the state of polarization of the incoming light beam can be performed by a controller. The computations may occur in quasi-real time as the intensities are measured in some embodiments whereas, in some other embodiments, the measured intensities can be stored on a memory of the controller for subsequent computation. The controller can be provided as a combination of hardware and software components. The hardware components can be implemented in the form of a computing device 300, an example of which is described with reference to FIG. 3.

As depicted, the computing device 300 can have a processor 302, a memory 304, and I/O interface 306. Instructions 308 for determining the state of polarization of the incoming light beam can be stored on the memory 304 and accessible by the processor 302. For instance, the interferometry pattern, expressed in terms of matrix W, can be stored on the memory 304 and accessible by the processor 302.

The processor 302 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 304 can include a suitable combination of any type of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The interferometry pattern can be stored on the memory 304 and accessible by the processor 302.

Each I/O interface 306 enables the computing device 300 to interconnect with one or more input devices, such as one or more optical detectors, a keyboard, a mouse, a pointer, or with one or more output devices such as a display, a remote network and the like.

Each I/O interface 306 enables the controller to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The computing device 300 described above are meant to be examples only. Other suitable embodiments of the controller can also be provided, as it will be apparent to the skilled reader.

FIG. 4 is a schematic view of a second example of a substrate-mounted polarimeter 400. As depicted, the phase-retardant waveguides 416a, 416b, 416c and 416d have respective phase delays $\theta_1, \theta_2, \theta_3,$ and $\theta_4$ and the waveguide outputs 420 lead to intensities $I_1, I_2, I_3,$ and $I_4$ to be measured using corresponding detector units. In this example, the polarimeter 400 is a silicon photonic (SiP) four photodetectors (PDs) division-of-amplitude polarimeters (4PD-DO-APs) using a CMOS-compatible photonic fabrication process. The design of the polarimeter 400 targets to minimize the number of optical components.

As depicted, the polarimeter 400 has a substrate 402, a polarization splitter 404 on the substrate 402 and output waveguides 420 running on the substrate 402 and outputting first, second, third and fourth polarization components. In this example, the substrate 402 is designed for a standard 220-nm-thick silicon-on-insulator (SOI) wafer.

The polarization splitter 404 receives an incoming light beam 10 having a given state of polarization and polarization splits it into at least a first light beam 12 having a first polarization component and a second light beam 14 having a second polarization component.

In this example, the polarization splitter 404 is a four-way polarization splitter, with four splitter outputs. As shown, two of the splitter outputs propagate the first and second light beams 12 and 14 directly to respective output waveguides 420 without much interfering. The other two of the splitter outputs lead to the interferometry circuit 406 where the first and second light beams 12 and 14 are interfered with one another to form the third and fourth polarization components.

The interferometry circuit 406 has a first power splitter 414a which power splits the first light beam 12 into first and second phase-retardant waveguides 416a and 416b, and also a second power splitter 414b which power splits the second light beam 14 into third and fourth phase-retardant waveguides 416c and 416d. The interferometry circuit 406 also has a first polarization coupler 418a polarization coupling the first and third phase-retardant waveguides 416a and 416c to one another forming the third polarization component, and a second first polarization coupler 418*b* polarization coupling the second and fourth phase-retardant waveguides 416*b* and 416*d* to one another forming the fourth polarization component.

As can be appreciated, the components of the polarimeter 400 are optically coupled to one another in the following way in this specific example. The polarization splitter has first and second splitter outputs outputting the first light beam and third and fourth splitter outputs outputting the second light beam. In this example, the first and third splitter outputs are optically coupled to corresponding output waveguides leading to respective detector units. The second splitter output leads to the first power splitter whereas the fourth splitter output leads to the second power splitter via corresponding waveguides. As discussed above, the first power splitter receives the first light beam from the second splitter output and outputs the first and second phase-retardant waveguides. The second power splitter receives the second light beam from the fourth splitter output and outputs the third and fourth phase-retardant waveguides. The first polarization coupler receives the first and third phase-retardant waveguides, thereby coupling the first and second light beams to one another, and leads to a corresponding output waveguide. Similarly, the second polarization coupler receives the second and fourth phase-retardant waveguides, thereby coupling the first and second light beams to one another, in an asymmetric way, and leads to a corresponding output waveguide.

As discussed above, the third and fourth phase-retardant waveguides 416*c* and 416*d* are asymmetric with respect to the first and second phase-retardant waveguides 416*a* and 416*b*. More specifically, in this example, the first, second, third and fourth phase-retardant waveguides 416*a*, 416*b*, 416*c* and 416*d* have a respective one of first, second, third and fourth phase delays $\theta_1$, $\theta_2$, $\theta_3$, and $\theta_4$, with at least the first and fourth phase delays $\theta_1$ and $\theta_4$ being different from one another.

As shown, the output waveguides 420 output the first, second, third and fourth polarization components towards a common portion 402*a* of the substrate 402, where intensities of the polarization components can be measured. As shown in this example, the intensity $I_1$ of the first polarization component is indicative of an intensity of the first light beam 12, the intensity $I_2$ of the second polarization component is indicative of an intensity of the second light beam 14, the intensity $I_3$ denotes an intensity of the third polarization component, resulting from a linear combination of the first and second light beams 12 and 14, and the intensity $I_4$ denotes an intensity of the fourth polarization component which results from a different linear combination of the first and second light beams 12 and 14.

The polarimeter 400 can produce a complete analysis matrix of an optimally conditioned polarimeter. Specifically, the polarimeter 400 is a division-of-amplitude polarimeter (DOAP) that splits the incoming light beam into several light beams for fast, simultaneous measurements. As the full reconstruction of the Stokes vector in principle requires only four intensity measurements, the interferometry circuit 406 of the polarimeter 400 splits the incoming light beam 10 in a way that provide four polarization components from which the complete state of polarization (SoP) of the incoming light beam can be reconstructed.

As discussed above, the SoP is typically characterized by a 4×1 Stokes vector. Therefore, complete reconstruction of the SoP requires a minimum of four distinct measurements, which can be realized by projecting the Stokes vector onto four or more analysis states determined by the Mueller matrix (analysis matrix) of the polarimeter. In classical free-space optical systems, this operation can be achieved via rotating polarizers or via retarders in combination of a fixed polarizer. In a PIC, this can be realized through waveguide interferometers without mechanical moving parts. For instance, FIGS. 5A-C show PIC counterparts 500 of some free-space optical components 500' commonly used in free-space Stokes polarimeters. A SPS can decompose the two orthogonal E-field components (Ex and Ey), each coupling (ideally with equal power) into two single-mode waveguides that guide in opposite directions. As shown in FIG. 5A, the SPS functions as combined polarization beam splitter (PBS) and half-wave plate (HWP) in a conventional free-space optical system. An on-chip beam combiner (i.e., 3-dB Y-branch) coherently combines Ex and Ey (orthogonal in free space, but coupled to the same mode in two waveguides), as shown in FIG. 5B, outputting $\sqrt{2}/2$(Ex+Ey), which is equivalent to a 45° linear polarizer. FIG. 5C shows two phase-retardant waveguides, acting as a retarder, which thanks to the different lengths of the two waveguides, can introduce a phase difference between Ex and Ey.

The polarimeter 400 transforms the Stokes vector into a series of intensities that can be detected by PDs. The analysis matrix W defines the transformation:

$$I = W \cdot S + n, \quad (2)$$

where S=(S0,S1,S2,S3)$^\tau$ is the input Stokes vector, I=($I_1$, $I_2$, ..., $I_N$)$^\tau$ is an N-dimensional vector representing the measured intensities, not to be confused with the identity matrix. The noise contribution of the PDs is n. The estimated Stokes vector $\hat{S}$ is given by:

$$\hat{S} = W^\dagger \cdot W \cdot S + W^\dagger \cdot n, \quad (3)$$

where $W^\dagger$ denotes the generalized inverse of W, also known as the synthesis matrix. Here, only the case of N=4 is considered, so that $W^\dagger = W^{-1}$. The error of the estimated Stokes vector can be obtained by:

$$\Delta S = \hat{S} - S = W^{-1} \cdot n. \quad (4)$$

Equation (4) shows that the estimation error is influenced by the noise level and the synthesis matrix. For noise n, with covariance matrix $\Gamma$, taking expectations, one can obtain:

$$\text{Cov}(\hat{S}) = E\{\Delta S(\Delta S)^T\} = W^{-1}\Gamma(W^{-1})^T. \quad (5)$$

In the presence of additive white Gaussian noise (AWGN), and when the noise at each PD is zero mean and identically distributed with variance $\sigma_n^2$, one can have:

$$\text{Cov}(\hat{S}) = \sigma_n^2 W^{-1}(W^{-1})^T. \quad (6)$$

The condition number $\kappa = \|W\| \cdot \|W^{-1}\|$ is a figure of merit often used to evaluate polarimeter performance, where $\|*\|$ is the matrix form (taken as the $L_2$ norm throughout this example). The detection SNR is maximized when the condition number is minimized.

In the presence of shot noise (e.g., Poisson noise), assuming independent noise in each PD, the noise covariance matrix is diagonal with $i^{th}$ entry proportional to the $i^{th}$ detected signal power. For $A_{ij}$, denoting the i,j element of matrix A, this means:

$$\Gamma_{i,j} \propto (WS)_{i,j}. \tag{7}$$

Therefore, the variance of the Stokes estimate is SoP dependent for Poisson noise. As the signal power varies across PDs, the Poisson noise is not identically distributed (unlike the AWGN). For best performance, the polarimeter 400 would equalize the noise variances.

Matrix Q is thus defined by:

$$Q_{i,j} = \sum_{n=1}^{4} [w_{(i+1)n}^{-1}] w_{n(j+1)}, \tag{8}$$

where $u^i = (Q_{i1}, Q_{i2}, Q_{i3})^\tau$, and P as the degree of polarization. As the Poisson variance depends on S, each component of $\hat{S}$ will have some maximum variance, $\gamma_i^{max}$, and minimum variance, $\gamma_i^{min}$, associated with that component. The mean excursion between these extrema, $\Delta\gamma$, is given by:

$$\Delta\gamma = \frac{1}{3} \cdot \sum_{n=1}^{3} (\gamma_i^{max} - \gamma_i^{min}) = \frac{2}{3} \cdot S_0 P \sum_{n=1}^{3} \|u^i\|, \tag{9}$$

The polarimeter 400 can equalize the noise for zero excursion, i.e., where maximum noise variance $\gamma_i^{max}$ equal to minimum noise variance $\gamma_i^{min}$ on each Stokes vector component. An optical structure is thus sought to minimize the condition number $\kappa$ and the variance difference $\Delta\gamma$.

As such, the incoming light is split into four waveguides by the four-way polarization splitter. The optical waves propagating in the four waveguides (e.g., $\sqrt{2}/2E_x$, $\sqrt{2}/2E_y$, $\sqrt{2}/2E_x$, $\sqrt{2}/2E_y$) carry the full information of SoP of the incoming light. Two of the optical paths are split into four paths by two 50:50 power splitters, and then they separately pass through unique $\theta_i$-phase-retard waveguides, and cross-coupled using 50:50 polarization couplers.

The first and second light beams 12 and 14 which pass through the first and third phase-retardant waveguides 416a and 416c are by construction coherent with each other and they combine to yield intensity $I_2$. The first and second light beams 12 and 14 passing through the second and fourth phase-retardant waveguides 416b and 416d are also coherent, yielding $I_3$. This section of the polarimeter 400 is called a crossing coherent analyzer.

In this example, the remaining waveguides 426 do not pass through any components, and yield intensities $I_1$ and $I_2$, respectively. A 3-dB optical attenuator is added before the PDs to distribute unpolarized light equally among the four outputs, intensities $I_1$ through $I_4$. As discussed above, the asymmetricity between the first and second phase-retardant waveguides 416a and 416b and the third and fourth phase-retardant waveguides 416c and 416d is provided by phase delays being different between the two pairs of phase-retardant waveguides. For instance, in some embodiments, the first, second, third and fourth phase-retardant waveguides 416a, 416b, 416c and 416d have a respective one of first, second, third and fourth phase delays $\theta_1$, $\theta_2$, $\theta_3$, and $\theta_4$. For instance, the asymmetricity may be obtained by ensuring that at least the first and fourth phase delays $\theta_1$ and $\theta_4$ are different from one another, $\theta_1 \neq \theta_4$.

The analysis matrix $W_1$ of the polarimeter 400 is therefore:

$$W_1 \propto \frac{1}{8} \begin{pmatrix} 1 & 1 & 0 & 0 \\ 1 & 0 & \cos(\theta_1 - \theta_3) & -\sin(\theta_1 - \theta_3) \\ 1 & 0 & \cos(\theta_4 - \theta_2) & \sin(\theta_4 - \theta_2) \\ 1 & -1 & 0 & 0 \end{pmatrix}, \tag{10}$$

Figure 6:
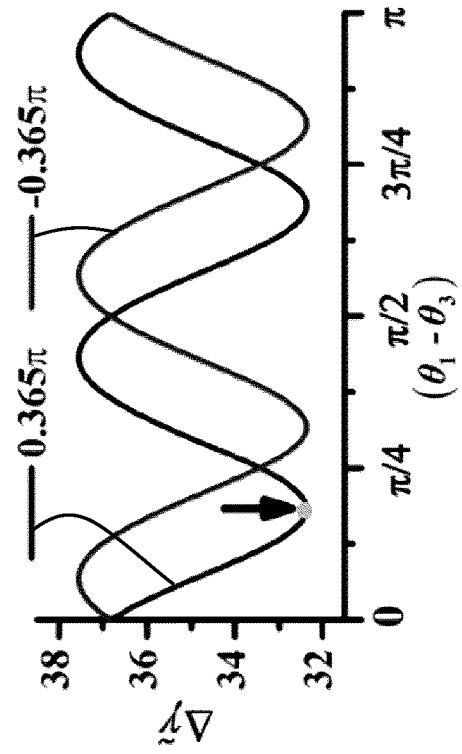
FIG. 6 is a graph showing condition number as function of $(\theta_1-\theta_3)$ and $(\theta_4-\theta_2)$ for the polarimeter of FIG. 4, in accordance with one or more embodiments.

FIG. 6 shows the condition number $\kappa$ for the polarimeter 400 and is plotted as a function with $(\theta_1-\theta_3)$ and $(\theta_4-\theta_2)$. The minimum condition number $\kappa_{min}$ can be obtained when:

$$(\theta_1 - \theta_3 + \theta_4 - \theta_2) = (2m \pm 0.365)\pi, \tag{11}$$

where m is any integer.

Figure 7:
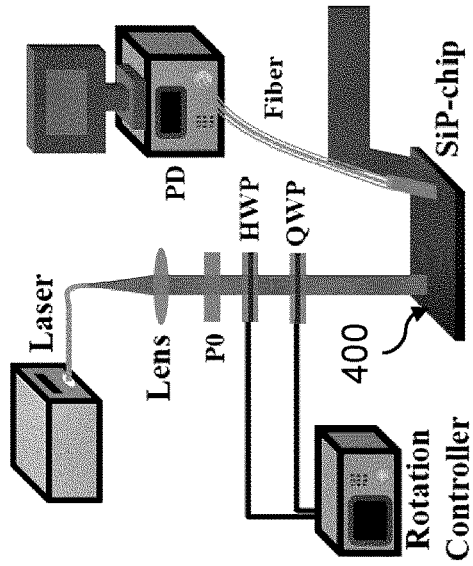
FIG. 7 is a graph showing noise variance excursion $\Delta\tilde{\gamma}$ as function of $(\theta_1-\theta_3)$ and $(\theta_4-\theta_2)$ for the polarimeter of FIG. 4, in accordance with one or more embodiments.

The polarimeter 400 cam be next improved by minimizing $\Delta\gamma$, or equivalently, minimizing $\Delta\tilde{\gamma} = \Sigma_{n=1}^{3}\|u^i\|$. The variation of $\Delta\tilde{\gamma}$ with $\theta_{up}$ for Eq. (11) is depicted in FIG. 7. For the m=0 case, the minimum $\Delta\tilde{\gamma}$ is observed at $(\theta_1-\theta_3)=0.1825\pi$ or $0.3175\pi$. For this design, $(\theta_1-\theta_3)$ has been selected to be $0.1825\pi$, see arrow in FIG. 7. The experimental characterization of the polarimeter 400 is discussed in the following paragraphs. The analysis matrix $W_a$ is:

$$W_a \propto \frac{1}{8} \cdot \begin{pmatrix} 1 & 1 & 0 & 0 \\ 1 & 0 & 0.84 & -0.542 \\ 1 & 0 & 0.84 & 0.542 \\ 1 & -1 & 0 & 0 \end{pmatrix}. \tag{12}$$

Figure 8A:
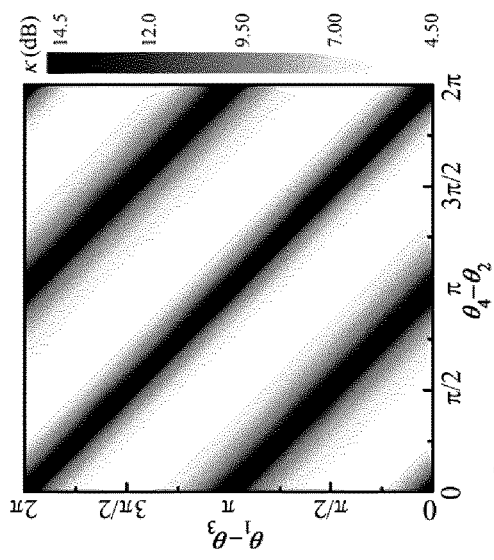
FIG. 8A is a scanning electron microscope image of the polarimeter of FIG. 4, with an inset showing an enlarged view of a polarization splitter, in accordance with one or more embodiments.
Figure 8B:
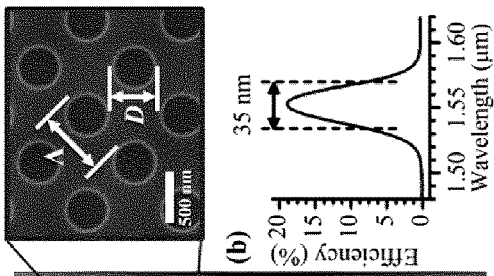
FIG. 8B is a graph showing efficiency as a function of wavelength for the polarization splitter of FIG. 8A, in accordance with one or more embodiments.

The polarimeter 400 was fabricated using a CMOS-compatible process with the electron-beam lithography on an SOI platform, in which the thicknesses of the silicon and oxide layers are 220 nm and 2 μm, respectively. The scanning electron microscope (SEM) image of the polarimeter 400 is presented in FIG. 8A. The size of the strip waveguides are 500 nm×220 nm. The polarization splitter is formed using a 30×30 array of cylindrical holes fully etched through silicon with a period Λ of 695 nm and a hole diameter D of 440 nm (as shown in an inset of FIG. 8A). The numerical efficiency of the SPS is given in FIG. 8B, showing that its 3-dB bandwidth is 35 nm and that the centre wavelength is 1550 nm.

Figure 9:
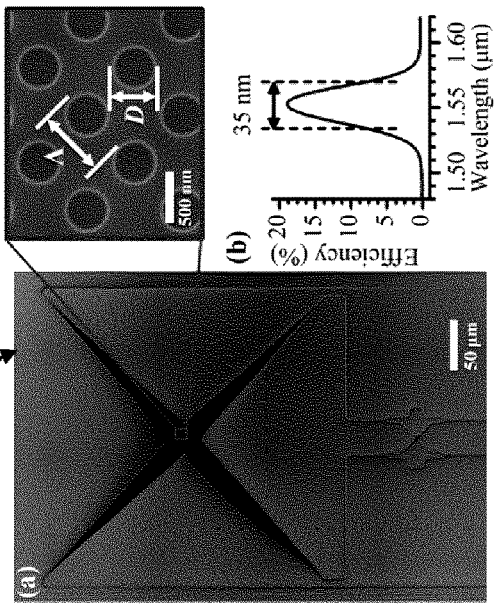
FIG. 9 is a schematic view of an example of an experimental setup testing the polarimeter of FIG. 4, in accordance with one or more embodiments.

An experiment setup to test the polarimeter 400 is shown in FIG. 9. A linearly polarized light beam is generated using a tunable laser. The SoP is controlled by a polarizer (650-2000 nm, Thorlabs), an HWP (1550 nm, Thorlabs), and a quarter-wave plate (QWP, 1550 nm, Thorlabs). The orientation of the polarizer is fixed at 0° with respect to the x-axis. Rotating the HWP and QWP can allow generation of any SoPs. Two stepper motor rotations (K10CR1/M, Thorlabs) are separately used to control the angles of the HWP and QWP. The four output waveguides of the polarimeter 400 are readout using off-chip photodetectors through optical fibers.

Figure 10:
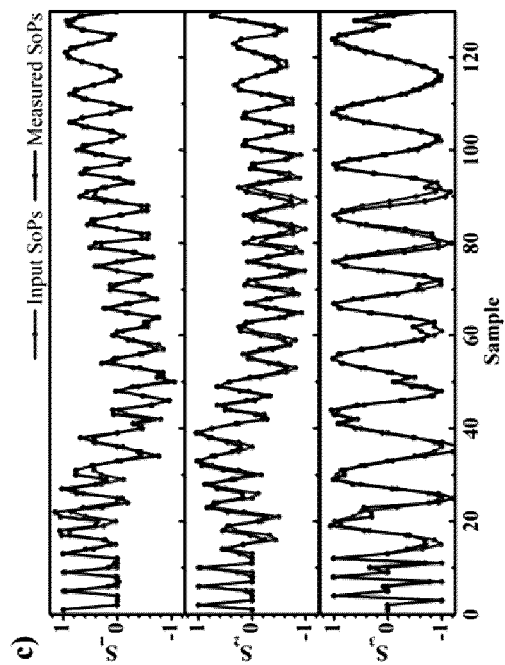
FIG. 10 is a graph showing polarization components of different light beams measured using both the experimental setup of FIG. 9 and a commercial free-space polarimeter, in accordance with one or more embodiments.

Through rotating the HWP and QWP, a series of SoPs can be generated such that the series of SoPs can spread widely over the surface of a Poincaré sphere. The polarimeter 400 was used to measure a plurality of SoPs of different incoming light beams. The measured results and the corresponding input SoPs are depicted in FIG. 10. A satisfactory agreement is observed between the input and measured SoPs. Because the polarimeter 400 is unpackaged, the experimental set-up vibrations would cause near 0.8-dB of intensity measurement relative errors, which would bring near 0.114 of root-mean-square (RMS) error of the SoP measurements. Therefore, the RMS error of the Stokes vector reconstruction is very high and achieves 0.147 in this example. The RMS error can be significantly reduced after packaging or using integrated PDs on a chip.

Figure 11:
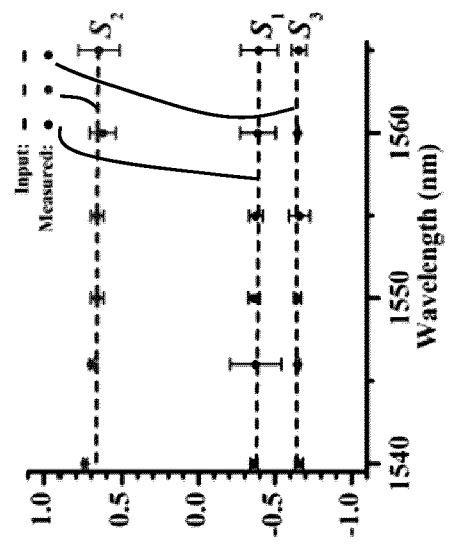
FIG. 11 is a graph showing polarization components of an incoming light beam measured using the polarimeter of FIG. 4 as a function of spectral components of the incoming light beam, in accordance with one or more embodiments.

The polarimeter 400 responds to a plurality of spectral components (e.g., wavelengths). As such, the orientations of the HWP and QWP are fixed at 20° and 60° with respect to the x-axis, respectively, and allow the tuning of the spectral component of the incoming light beam from 1540 nm to 1565 nm. The input SoPs as a function of wavelengths are shown in the dashed line of FIG. 11. The dots with error bar in the FIG. 11 are the measured results of the polarimeter 400. The measured results can be observed to agree well with the corresponding input SoPs at other wavelengths.

The condition number of the polarimeter 400 described with reference to FIG. 4 is $1.65\sqrt{3}$, which is higher than the theoretical minimum value for a full-Stokes polarimeter. The noise variances of each Stokes element estimate are sensitive to the incoming SoP in the presence of signal-dependent Poisson shot noise.

Figure 12:
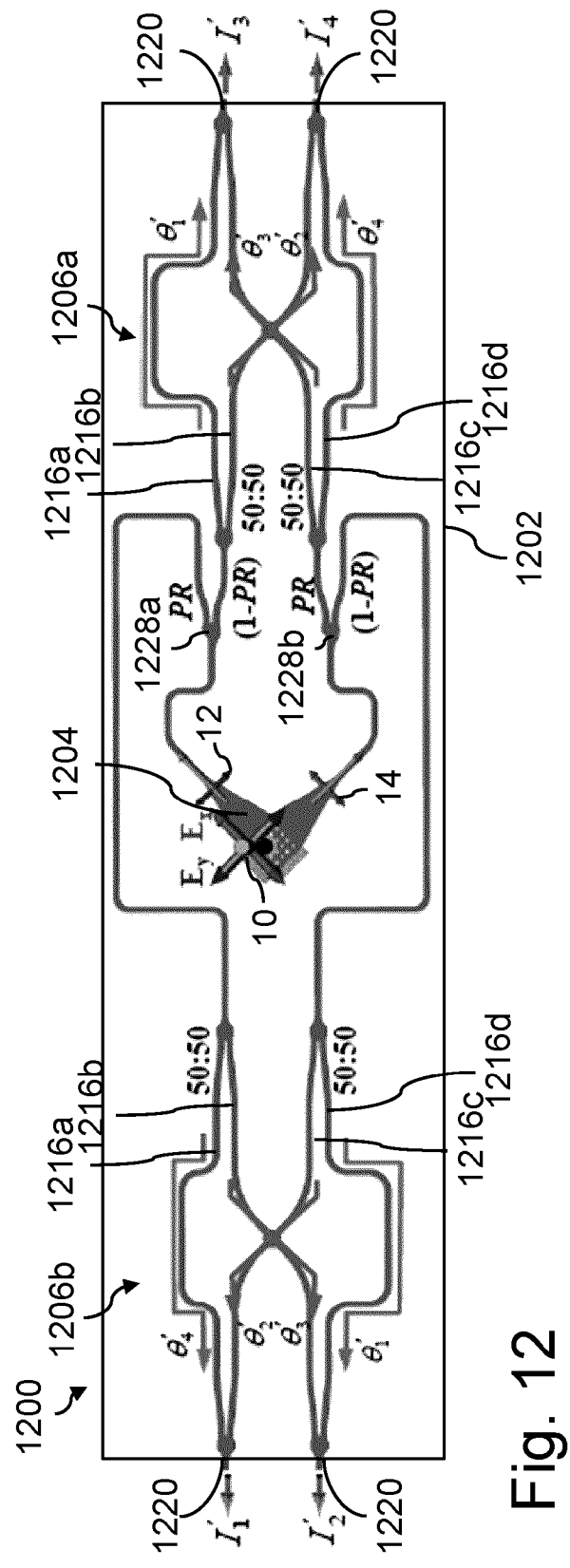
FIG. 12 is a schematic view of a third example of a polarimeter, shown with asymmetrical power splitters leading to first and second interferometry circuits, in accordance with one or more embodiments.

FIG. 12 is a schematic view of a third example of a substrate-mounted polarimeter 1200. In this example, the polarimeter 1200 is another example of a silicon photonic (SiP) four photodetectors (PD) division-of-amplitude polarimeters (4PD-DOAPs) using a CMOS-compatible photonic fabrication process. The design of the polarimeter 1200 design makes use of a slightly more complex circuit design to achieve an optimal frame for measurements;

this measurement frame minimizes and equalizes estimation variances in the presence of both additive white Gaussian noise and signal dependent shot noise. Further theoretical examination reveals that within the optimal measurement frames for Stokes polarimeters, the DOAP with four PDs has the minimal equally weighted variance compared to those with a greater number of PDs. To the best of our knowledge, this is a satisfactory demonstration of a chip scale, solid-state full-Stokes polarimeter with an optimal measurement frame providing minimal and equalized noise variance on each Stokes channel.

As depicted, the polarimeter 1200 has a substrate 1202, a polarization splitter 1204 on the substrate 1202 and output waveguides 1220 running on the substrate 1202 and outputting first, second, third and fourth polarization components. The substrate 1202 is designed for a standard 220-nm-thick silicon-on-insulator (SOI) wafer.

The polarization splitter 1204 receives an incoming light beam 10 having a given state of polarization and polarization splits it into at least first and second light beams 12 and 14.

In this example, the polarization splitter 1204 is a two-way polarization splitter, with two splitter outputs. As shown, a first one of the splitter outputs propagates the first light beam 12 towards a first asymmetric splitter 1228a whereas a second one of the splitter output propagates the second light beam 14 towards a second asymmetric splitter 1228b. As one branch of the first and second asymmetric splitters 1128a and 1228b leads to a first interferometry circuit 1206a, the other branch thereof leads to a second interferometry circuit 1206b. As shown, the first and second asymmetric splitters 1128a and 1228b couple towards the second interferometry circuit 1206b with a coupling factor PR and couple towards the first interferometry circuit 1206a with a complementary coupling factor of PR'=1−PR.

Each of the first and second interferometry circuits 1206a and 1206b has a similar construction than the interferometry circuit 406 of the polarimeter 400 shown in FIG. 4. Referring back to FIG. 12, the first asymmetric power splitter 1228a power splits the first light beam 12 towards the first power splitter of the first interferometry circuit and a first power splitter of the second interferometry circuit. Similarly, the second asymmetric power splitter 1228b power splits the second light beam 14 towards the second power splitter of the first interferometry circuit and the second power splitter of the second interferometry circuit.

As can be appreciated, the components of the polarimeter 1200 are optically coupled to one another in the following way in this specific example. The polarization splitter has first and second splitter outputs outputting the first and second light beams, respectively. The first and second light beams are both split in an asymmetric fashion towards a respective one of the first and second interferometry circuits via the first and second asymmetric power splitters. As such, the first light beam is propagated towards the first power splitter of the first interferometry circuit and towards the first power splitter of the second interferometry circuit. Similarly, the second light beam is propagated towards the second power splitter of the first interferometry circuit and towards the second power splitter of the second interferometry circuit. As such, the first polarization coupler of the first interferometry circuit leads to the first polarization component, the second polarization coupler of the first interferometry circuit leads to the second polarization component, the first polarization coupler of the second interferometry circuit leads to the third polarization component, and the second polarization coupler of the second interferometry circuit leads to the fourth polarization component.

As shown, the first, second, third and fourth phase-retardant waveguides 1216a, 1216b, 1216c and 1216d of the first interferometry circuit 1206a have a respective one of first, second, third and fourth phase delays $\theta'_1$, $\theta'_3$, $\theta'_2$, and $\theta'_4$, whereas the first, second, third and fourth phase-retardant waveguides 1216a, 1216b, 1216c and 1216d of the second interferometry circuit 1206b have a respective one of said fourth, third, second and first phase delays $\theta'_4$, $\theta'_2$, $\theta'_3$, and $\theta'_1$, with at least said first and fourth phase delays $\theta'_1$ and $\theta'_4$ being different from one another.

Figure 13:
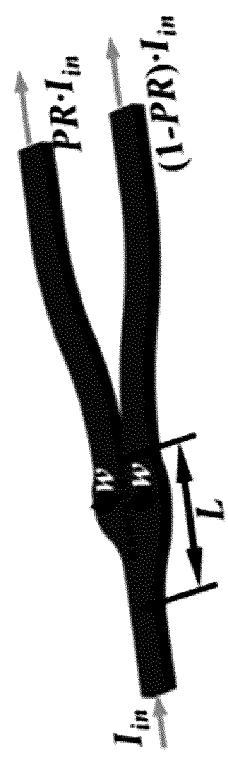
FIG. 13 is a schematic view of an example of an asymmetrical power splitter of FIG. 12, in accordance with one or more embodiments.

As such, the polarimeter 1200 has two interferometry circuits 1206a and 1206b each having a respective crossing coherent analyzer and two asymmetric power splitters (APS) 1228a and 1228b. The APS 1228a and 1228b are located between the polarization splitter 1204 and the interferometry circuits 1206a and 1206b. FIG. 13 shows an example of an asymmetric power splitter. For APS, the values of the weaker and the relatively longer output power ratio are denoted by PR and (1−PR), respectively. In this example, the length (L) and width (2w) of the splitting region of APS are equal to 2.32 μm and 1.4 μm, respectively. By controlling the asymmetry of APS, the output power ratio PR can be controlled. Besides, a 2-ports SPS is designed to replace the 4-ports SPS. To increase the efficiency of the 2-ports SPS, two distributed Bragg reflection (DBR) gratings are added at two idle ports of the SPS. DBR gratings can reflect the lights back to the desired waveguides.

Figure 14:
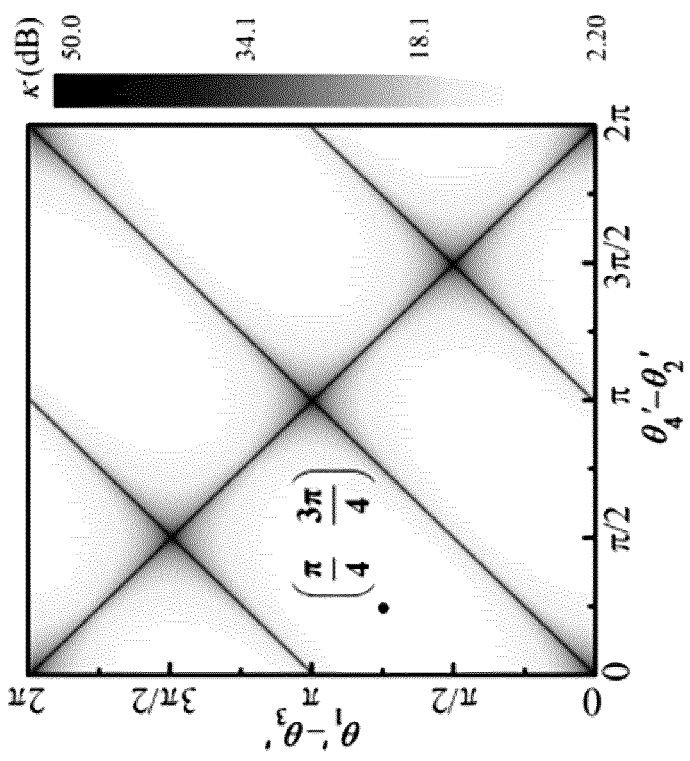
FIG. 14 is a graph showing condition number as a function of $(\theta'_1-\theta'_3)$ and $(\theta'_4-\theta'_2)$ for the polarimeter of FIG. 12, in accordance with one or more embodiments.

In this example, the polarimeter 1200 has an interferometry pattern represented by a synthesis matrix $W_2$, in which the state of polarization S of the incoming light beam is determinable using the equation $S=W_2 \cdot I$, where S is a vector denoting said state of polarization $(S_0, S_1, S_2, S_3)^\tau$ of the incoming light beam, and I is a vector denoting intensities $(I'_1, I'_2, I'_3, I'_4)^\tau$ of the polarization components. The synthesis matrix $W_2$ is given by a matrix equivalent to the following matrix:

$$w_2 = \begin{pmatrix} 1 & \frac{\tau-1}{\tau+1} & \frac{2\sqrt{\tau}\cos(\theta'_4-\theta'_2)}{\tau+1} & \frac{-2\sqrt{\tau}\sin(\theta'_4-\theta'_2)}{\tau+1} \\ 1 & \frac{\tau-1}{\tau+1} & \frac{2\sqrt{\tau}\cos(\theta'_1-\theta'_3)}{\tau+1} & \frac{2\sqrt{\tau}\sin(\theta'_1-\theta'_3)}{\tau+1} \\ 1 & \frac{1-\tau}{\tau+1} & \frac{2\sqrt{\tau}\cos(\theta'_1-\theta'_3)}{\tau+1} & \frac{-2\sqrt{\tau}\sin(\theta'_1-\theta'_3)}{\tau+1} \\ 1 & \frac{1-\tau}{\tau+1} & \frac{2\sqrt{\tau}\cos(\theta'_4-\theta'_2)}{\tau+1} & \frac{2\sqrt{\tau}\sin(\theta'_4-\theta'_2)}{\tau+1} \end{pmatrix}, \quad (13)$$

where $\tau$ denotes a ratio of the coupling coefficients represented by PR/(1−PR). There are only two analysis matrices (within arbitrary row permutations) which have the properties of $\kappa=\sqrt{3}$ and $\Delta\gamma=0$. The two analysis matrices $W_b$ and $W_{b'}$ have the following formulas:

$$W_b \propto A \begin{pmatrix} 1 & -\frac{1}{\sqrt{3}} & -\frac{1}{\sqrt{3}} & -\frac{1}{\sqrt{3}} \\ 1 & -\frac{1}{\sqrt{3}} & \frac{1}{\sqrt{3}} & \frac{1}{\sqrt{3}} \\ 1 & \frac{1}{\sqrt{3}} & \frac{1}{\sqrt{3}} & -\frac{1}{\sqrt{3}} \\ 1 & \frac{1}{\sqrt{3}} & -\frac{1}{\sqrt{3}} & \frac{1}{\sqrt{3}} \end{pmatrix}, \text{ and} \quad (14)$$

$$W_{b'} \propto A \begin{pmatrix} 1 & -\frac{1}{\sqrt{3}} & \frac{1}{\sqrt{3}} & -\frac{1}{\sqrt{3}} \\ 1 & -\frac{1}{\sqrt{3}} & -\frac{1}{\sqrt{3}} & \frac{1}{\sqrt{3}} \\ 1 & \frac{1}{\sqrt{3}} & -\frac{1}{\sqrt{3}} & -\frac{1}{\sqrt{3}} \\ 1 & \frac{1}{\sqrt{3}} & \frac{1}{\sqrt{3}} & \frac{1}{\sqrt{3}} \end{pmatrix}, \quad (15)$$

where A is a positive value (0<A≤½), and here A=¼. Comparing Eqs. (13) with (14) and (15), one can obtain that when $\tau=2-\sqrt{3}$, the condition number of the polarimeter would have the potential to achieve optical performance. When $\tau=2-\sqrt{3}$, the condition number as a function with $(\theta'_1-\theta'_3)$ and $(\theta'_4-\theta'_2)$ is presented in FIG. 14, which shows that when $(\theta'_1-\theta'_3)=2n\pi\pm\pi/4$ and $(\theta'_4-\theta'_2)=2n\pi\pm3\pi/4$ (where n is an integer), the optical condition number ($\sqrt{3}$) can be obtained. The analysis $W_b$ can be achieved when $(\theta'_1-\theta'_3)=3\pi/4$ and $(\theta'_4-\theta'_2)=\pi/4$.

Figure 15:
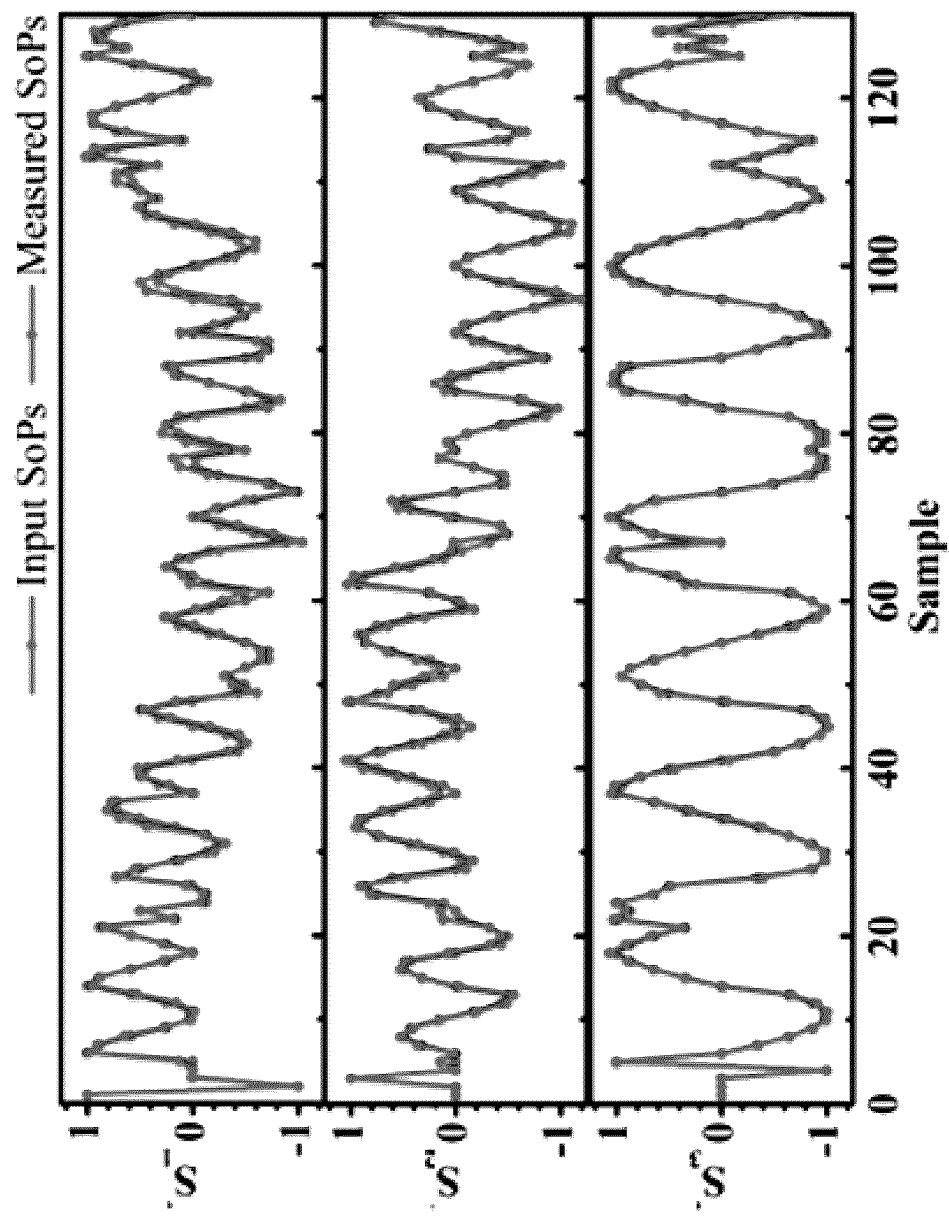
FIG. 15 is a graph showing polarization components of different light beams measured using both the polarimeter of FIG. 12 and a commercial free-space polarimeter, in accordance with one or more embodiments.

The structure of $(\theta'_1-\theta'_3)=3\pi/4$, $(\theta'_4-\theta'_2)=\pi/4$, and $\tau=2-\sqrt{3}$ was chosen to be fabricated and experimentally demonstrated. In this example, the polarimeter 1200 has a footprint of 350×460 μm². The DBR can consist of eight alternating layers of silicon and silicon dioxide in some embodiments. The width of silicon layer, and the lattice period are 160 nm, and 360 nm, respectively. The polarimeter 1200 was used to measure a series of SoPs, and the corresponding results are depicted in FIG. 15. The measured results agree well with the input SoPs. Its RMS error is near 0.081 which is 44% lower than that of the polarimeter 1200 under the same 0.8-dB of intensity measurement relative errors caused by the vibrations of the experimental set-up.

The polarimeter 1200 can be regarded as a projector that projects the input Stokes vector onto an intensity vector of measurement. For simplicity, one normalizes the analysis matrix W so that $W_{i1}^2=W_{i2}^2+W_{i3}^2+W_{i4}^2=1$, where i means the $i^{th}$ row of the matrix. Therefore, the endpoints of the reduced vectors $w_{i1}=(w_{i2}, w_{i3}, w_{i4})$ are located on the surface of a Poincaré sphere. The measurement frame (i.e., the set of vectors $\{w_1\}$) can be described by a polyhedron whose vertexes are defined by the endpoints of the reduced vectors $w_i$. It has been demonstrated that the Platonic polyhedron can achieve the minimum condition number. The polarimeter 1200 whose measurement frame is an irregular tetrahedron does not have the minimum condition number. The regular tetrahedron is a spherical 2-design with N=4, which has been proven to not be able to realize noise variance equalization except for two particular orientations in the presence of Poisson noise. However, this limitation can be broken via the regular octahedron, which is the simplest spherical 3-design. The regular octahedron is one example: when rotated to another orientation, it remains such a property.

A number of polyhedrons can realize a minimal and equalized Poisson noise variance, but can suffer from different additive Gaussian noise. Here, one examines the impact of the detection number N on the total variance of the four Stokes channels (termed as equally weighted variance, EWV). Consider the cases of Platonic polyhedrons. The optical power received by each PD is proportional to $S_0/N$ (i.e., the DOAP, and the division of time polarimeter, DOTP which used in the scenario of "photon-starved"). In these cases, the analysis matrix W has the following properties:

$$\forall i(i=1, 2, \ldots, N), W_{i1} = \frac{1}{N}, \quad (16)$$

and $$W^T W = \frac{1}{3N}\begin{pmatrix} 3 & 0 & 0 & 0 \\ 0 & 1 & 0 & 0 \\ 0 & 0 & 1 & 0 \\ 0 & 0 & 0 & 1 \end{pmatrix}, \quad (17)$$

where $W^\tau$ is the transpose of W. For AWGN, $EWV_{add}$ is given by:

$$EWV_{add} = \sigma_n^2 \cdot Tr[(W^T W)^{-1}], \quad (18)$$

where $\sigma_n^2$ is the variance of the additive noise, and Tr(*) means the sum of the elements on the main diagonal (the diagonal from the upper left to the lower right) of *. Based on Eqs. (15) and (16), one can obtain that:

$$EWV_{add} = 10N\sigma_n^2. \quad (19)$$

For Poisson noise, $EVW_{Poi}$ has the following expression:

$$EWV_{Poi} = W_{11} \cdot S_0 \cdot Tr[(W^T W)^{-1}]. \quad (20)$$

Based on Eqs. (16), (17) and (20), one can obtain that:

$$EWV_{Poi} = 10 S_0. \quad (21)$$

From Eq. (19), one can know that in the presence of the additive noise, $EWV_{add}$ increases with N. Therefore, the regular tetrahedrons in the two specific orientations are the best architectures. On the other hand, Eq. (20) indicates that the $EWV_{Poi}$ is independent of the numbers of PDs. Overall, 4PD-DOAP not only has a relatively low cost in signal processing, but also is less influenced by noise in the reconstructions of SoP. Notice that the conclusion may be opposite for a DOTP, where no power splitting is required and SoP is detected at a relatively low speed. In this case, people usually take more measurements to suppress noise.

The above paragraphs discuss a demonstration of a chip scale, solid-state full-Stokes polarimeter with an optical frame in the presence of both Gaussian and Poisson noises. Two ultra-compact full-Stokes polarimeters 400 and 1200 have a minimum number of detector units and a CMOS-compatible fabrication process. The designs of these polarimeters were optimized taken into consideration both the condition number and estimated variance. A polarimeter architecture for an optical 4PD-DOAP analysis matrix ($W_b$ and $W_{b'}$) with the minimum condition number ($K=\sqrt{3}$) and Poisson shot noise equalization ($\Delta\gamma=0$) has been achieved in a PIC. Excellent agreement has been shown between the measured results using the polarimeters 400 and 1200 and a bench-top commercial instrument. It was shown that, within the optical frames of Stokes polarimeters, increasing the number of detections beyond four through power division causes a higher additive Gaussian noise while the Poisson shot noise is not affected. Therefore, 4PD-DOAP offers a theoretically optical DOAP design. The polarimeters 400 and 1200 can also be extended to other materials platforms, such as silicon nitride, and germanium for the visible and mid-infrared ranges. Furthermore, these compact polarimeters 400 and 1200 can be readily integrated with other silicon photonics devices such as spectrometers so that a comprehensive optical vector analysis can be achieved on a single chip for even broader applications.

Figure 16:
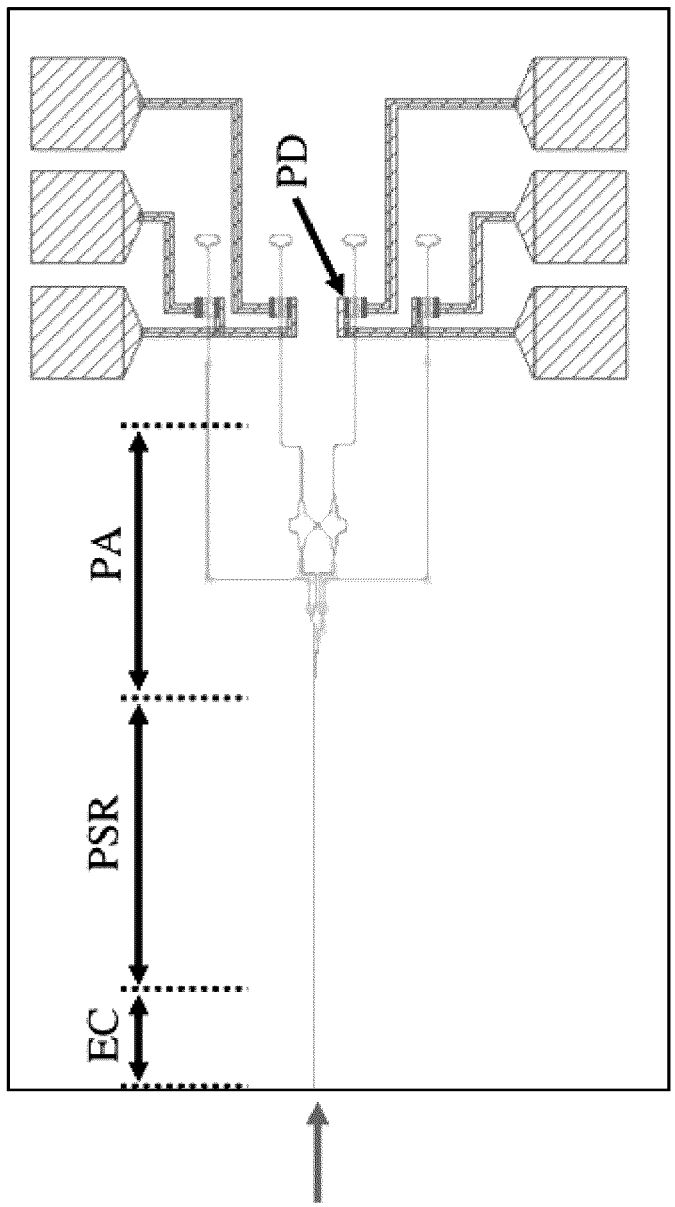
FIG. 16 is a top plan view of a fourth example of a polarimeter, shown with a polarization splitter provided in the form of an edge coupler optically coupled to a polarization splitter rotator, in accordance with one or more embodiments.

As mentioned above, the polarization splitter can be provided in the form of an assembly comprising an edge coupler and a polarization splitter rotator. FIG. 16 shows a top plan view of a third example of a polarimeter 1600 comprising such a polarization splitter. As depicted, the polarimeter 1600 has a substrate with a top surface and at least a lateral surface or edge. An interferometry circuit such as the ones described above is also on the substrate.

As illustrated, the polarization splitter has an edge coupler disposed on the lateral surface or edge of the substrate. In this way, a light beam incoming in a parallel manner to the top surface of the substrate will be injected in waveguide(s) of the polarimeter 1600 via the edge coupler. To split the polarization of the incoming light beam, the polarization splitter has a polarization splitter rotator which polarization splits the incoming light beam into the first and second light beams. In some embodiments, the polarization splitter rotator splits the two orthogonal linear polarization components (i.e., TE and TM modes) of the incoming light beam into two waveguides directed respectively to the first and second power splitters of the interferometry circuit. The TM mode of the incoming light beam is thereby rotated into the TE mode.

The polarimeter has detection units provided in the form of spaced-apart photodetectors such as photodiodes which are optically coupled to the interferometry circuit to receive the first, second, third and fourth polarization components. As shown, the photodiodes have sensors receiving the polarization components and generating corresponding signals which can be pickup at conducting pads electrically coupled to the sensors. In this embodiment, the detector units can be communicatively coupled to the controller via a wired connection. In some other embodiments, the signals can also be communicated in a wireless manner.

Figure 17:
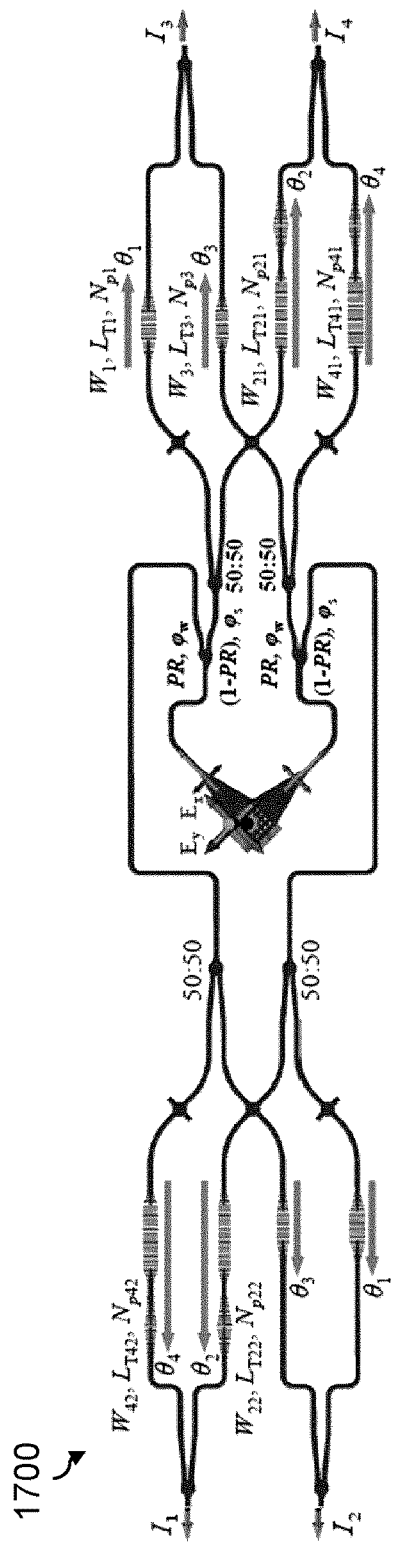
FIG. 17 is a schematic view of a fifth example of a polarimeter, shown with asymmetric subwavelength gratings as part of each phase-retardant waveguides, in accordance with one or more embodiments.
Figure 19:
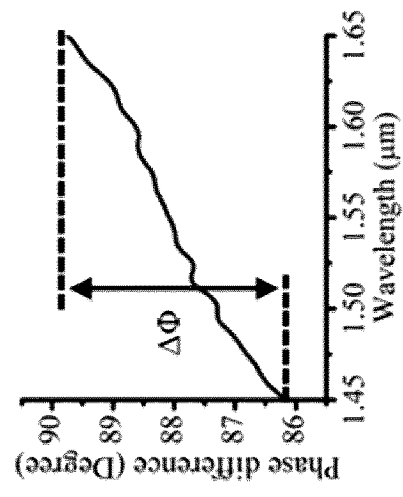
FIG. 19 is a graph showing the phase difference imparted by the asymmetric subwavelength gratings of FIG. 18 as a function of spectral components of an incoming light beam, in accordance with one or more embodiments.
Figure 18:
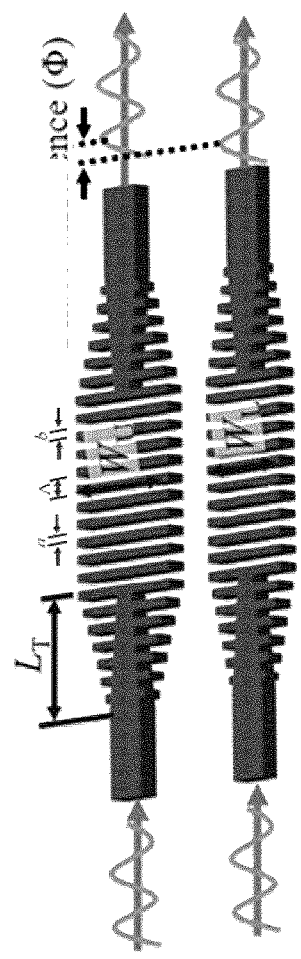
FIG. 18 is an enlarged view of two of the asymmetric subwavelength gratings of the polarimeter of FIG. 17, in accordance with one or more embodiments.

In some embodiments, it might be preferable to increase the spectral band within which the polarization components can satisfactorily propagate. FIG. 17 shows a fourth example of a polarimeter 1700. Although similar to the polarimeter 1200, the phase-retardant waveguides of the polarimeter 1700 are wavelength independent. For the first and second asymmetric power splitters, the output power ratio of the weaker paths and the relatively stronger paths are denoted by PR and (1−PR), respectively. The phase shift in the two paths as $\phi_w$ and $\phi_s$, respectively. The crossed coherent analyzer consists of phase-retardant waveguides provided in the form of subwavelength gratings (SWGs), examples of which are shown in FIG. 18. FIG. 19 shows the phase difference between the two SWGs of FIG. 18 across a given spectral band. The phase shifts of the four SWG waveguides are represented as $\theta_1$, $\theta_2$, $\theta_3$, and $\theta_4$, respectively.

As discussed above, when $(\theta_1-\theta_3)-(\phi_w-\phi_s)=2n\pi\pm\pi/4$ and $(\theta_4-\theta_2)+(\phi_w-\phi_s)=2n\pi\pm 3\pi/4$, or $(\theta_1\theta_3)-(\phi_w-\phi_s)=2n\pi\pm 3\pi/4$ and $(\theta_4\theta_2)+(\phi_w-\phi_s)=2n\pi\pm\pi/4$ (where n is an integer), one can obtain an optimal polarimeter in the presence of Gaussian and Poisson shot noise. Here, the parameters of $(\theta_1-\theta_3)-(\phi_w-\phi_s)=\pi/4$ and $(\theta_4-\theta_2)+(\phi_w-\phi_s)=3\pi/4$ are selected as an example to design a broadband optimal polarimeter. The optimal polarimeter also requires $PR/(1-PR)=2-\sqrt{3}\approx 0.2679$ in this specific example.

Figures 20, 21:
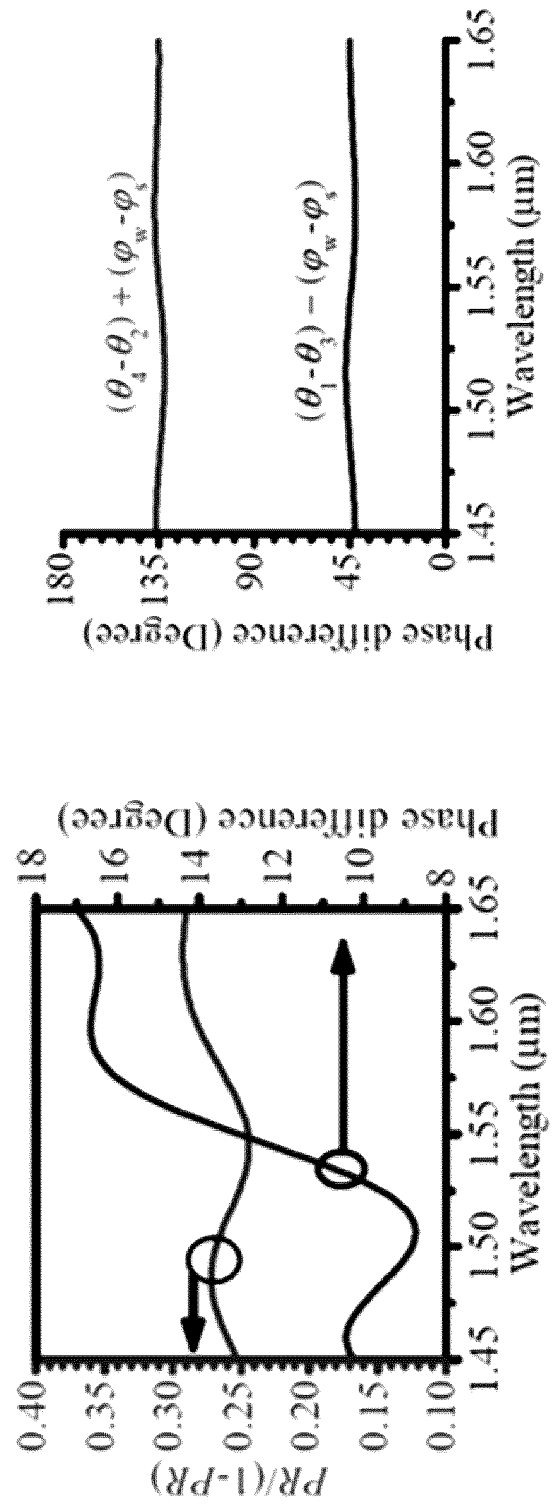
FIG. 20 is a graph showing a spectrum of a coupling coefficient of the asymmetric power splitters of the polarimeter of FIG. 17 and of a phase difference imparted by the polarimeter of FIG. 17, in accordance with one or more embodiments.
FIG. 21 is a graph showing a spectrum of the phase difference imparted by the polarimeter of FIG. 17 after compensation, in accordance with one or more embodiments.

FIG. 20 shows the PR/(1−PR) and $(\phi_w-\phi_s)$ of the asymmetric power splitter as a function of wavelength. The variation of the PR/(1−PR) is less than 0.05 over a wavelength range of 1.45 μm to 1.65 μm. The mean and variation of the $(\phi_w-\phi_s)$ are 12.81° and 8.28°, respectively. To compensate for $(\phi_w-\phi_s)$, the mean and variation of $(\theta_1-\theta_3)$ should be 57.81° and 8.28°, respectively. An asymmetric SWG PS with $W_1=1.5$ μm, $W_3=1.3$ μm, $L_{T1}=L_{T3}=5.4$ μm, and $N_{p1}=N_{p3}=11$ was selected to realize such a phase shift. As shown in FIG. 21, the variation of $(\theta_1-\theta_3)-(\phi_w-\phi_s)$ decreases to 4° after compensation. Similarly, the mean and variation of $(\theta_4-\theta_2)$ should be 122.19° and −8.28°, respectively. To achieve a variation of −8.28°, we cascaded two SWG PSs together as shown in FIG. 1700. The structural parameters of the two SWG PSs were: $W_{21}=1.3$ μm, $W_{41}=1.5$ μm, $L_{T21}=L_{T41}=3$ μm, $N_{p21}=N_{p41}=108$, and $W_{22}=1.5$ μm, $W_{42}=1.3$ μm, $L_{T22}=L_{T42}=6.8$ μm, $N_{p22}=N_{p42}=0$. The $(\theta_4-\theta_2)+(\phi_w-\phi_s)$ as a function of the wavelength is presented in FIG. 21.

Figure 22:
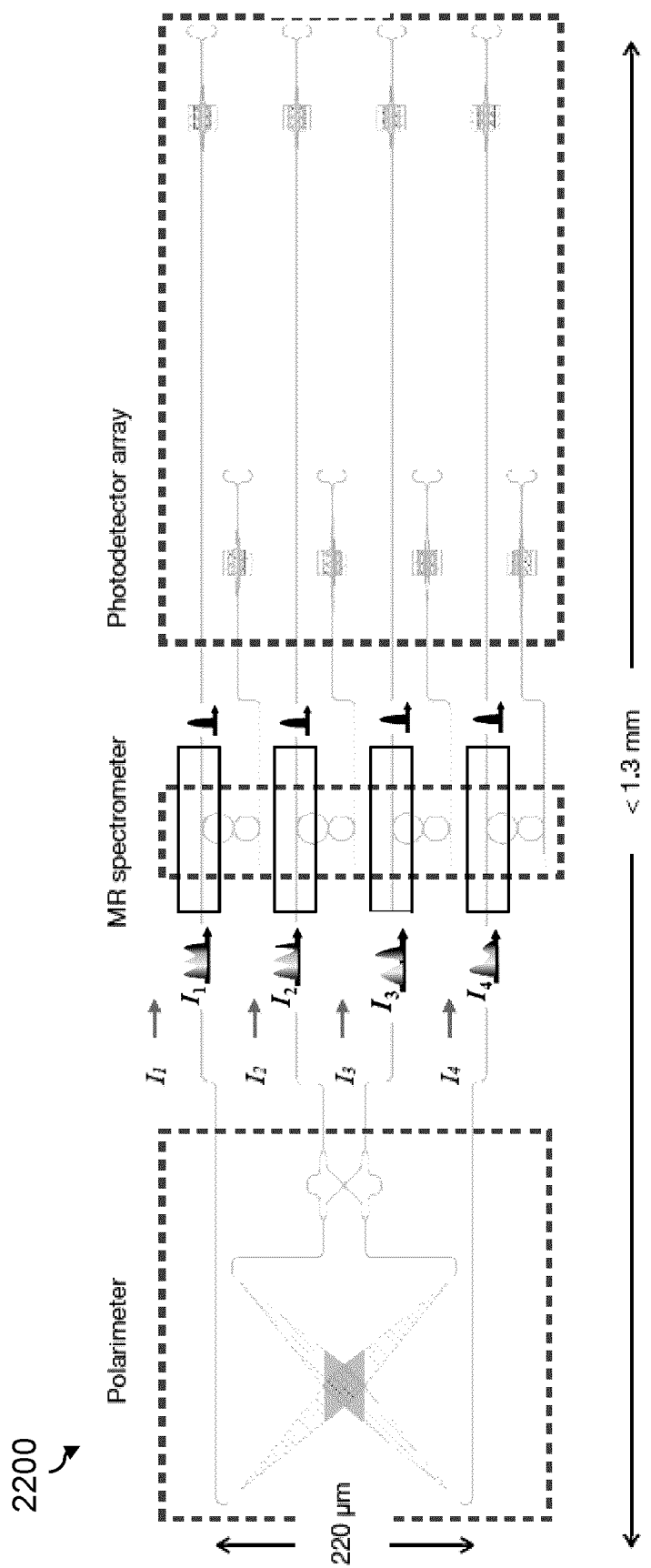
FIG. 22 is a schematic view of a sixth example of a polarimeter, shown with detector units provided in the form of optical spectrum analyzers each having a tunable filter and photodetector assembly, in accordance with one or more embodiments.

FIG. 22 shows a fifth example of a polarimeter 2200, in accordance with another embodiment. As depicted, the polarimeter 2200 has a polarization splitter and an interferometry circuit which leads to output waveguides each carrying a respective one of first, second, third and fourth polarization components. As can be appreciated, the polarization splitter and the interferometry circuit of this embodiment are similar to those described with reference to the polarimeter 400 of FIG. 4.

As will be described, the polarimeter 2200 is suited for determining a spectrally-varying state of polarization of the incoming light beam. More specifically, each of the detector units has an optical spectrum analyzer which can measure intensities at a plurality of spectral components for the corresponding polarization components. Each optical spectrum analyzer has a tunable filter which is tunable to direct a given spectral component towards a corresponding photodiode which measures the intensity at the selected spectral component. By sweeping the tunable filter across a given spectral band, intensity measurements at a plurality of spectral components can be measured successively. The construction of the optical spectrum analyzer can differ from one embodiment to another. However, in this specific embodiment, each optical spectrum analyzer or spectrometer is provided in the form of a microring resonator which can act as a filter to pick up a given spectral component from an incoming polarization component. As shown, each microring resonator can be tuned by modifying its temperature using heating elements. By contracting or expanding the microring, the coupling condition will vary thereby acting as a tunable filter. The four output spectra, $I_1(\lambda)$ to $I_4(\lambda)$, are eventually used to reconstruct wavelength-dependent Stokes parameters through linear matrix operations, as discussed above.

The polarimeter 2200 is thereby an example of a spectroscopic polarimeter which can be used in combination with a broadband source or optical frequency comb to measure matter-light interactions in both the spectral and polarization domains. As shown, the optical spectrum analyzers receive the polarization components from the interferometry circuit, and redirect them towards a plurality of spectrally spaced-apart channels. Each of the spectrally spaced-apart channels has a given spectral component or wavelength. As shown in this example, the optical spectrum analyzers have microring resonator(s) redirecting the spectrally-spaced channels into a plurality of optical detectors, e.g., photodiodes. Accordingly, the optical detectors are optically coupled at least to the drop ports of the microring resonators and measure corresponding intensity values from the plurality of spectrally spaced-apart channels. The controller, which is remote from the substrate in this example, can be configured to determine a spectrally-resolved state of polarization of the incoming light beam based on the measured intensity values and on the interferometry pattern of the interferometry circuit.

In some embodiment, the polarimeter 2200 can be designed based on a standard 220-nm-thick silicon-on-insulator (SOI) wafer with a 2 µm buried oxide layer and 3 µm oxide cladding. The polarization splitter can be provided in the form of a surface polarization splitter (SPS) used to project an arbitrary state of polarization into two orthogonal linearly polarized components ($E_x$ and $E_y$) and couple them into different waveguides. The interferometry circuit then converts the two orthogonal E-field components into four polarization components. The spectrum of each polarization component is measured using an optical spectrum analyzer consisting of a thermally tunable silicon dualmicroring resonator and a Ge-PD. The four spectral measurements thereby capture the full information of wavelength-dependent polarization, from which the Stokes spectra of the input light can eventually be retrieved via a matrix operation. As depicted in FIG. 22, the black arrows point to the propagating direction of light.

The SPS makes use of a nanoantenna structure, consisting of a 2D array of sub-wavelength cylindrical holes on a Si substrate in this example. The nanoantenna is designed so that both orthogonal linearly polarized components of the light, either from an optical fiber or free space, are coupled into the fundamental TE mode of the planar waveguides. Simultaneously, the SPS decomposes each orthogonal component equally into two splitter outputs in opposite directions as shown in FIG. 22.

The interferometry circuit consists of a 3-dB broadband directional coupler (BDC), three Y-junctions for 3-dB power splitting/combination, and a few delay lines. Taking the outputs of the SPS, the PA projects the Stokes vector of the incoming light into four intensity channels through interference operation: $I_1$ and $I_4$ from direct detection of $$\frac{\sqrt{2}}{2}E_x \text{ and } \frac{\sqrt{2}}{2}E_y,$$

respectively; $I_2$ from the interference between $$\frac{i}{2}E_x \text{ and } \frac{1}{2}E_y;$$

$I_3$ from the interference between $$\frac{1+i}{4}E_x \text{ and } \frac{1+i}{4}E_y.$$

Here, the incoming polarization is denoted by a wavelength ($\lambda$) dependent Stokes vector: $S(\lambda)=(S_0(\lambda), S_1(\lambda), S_2(\lambda), S_3(\lambda))^\tau$, where $(Y)^\tau$ means the transpose of the matrix $(Y)$. Defining a wavelength-dependent intensity vector: $I(\lambda)=(I_1(\lambda), I_2(\lambda), I_3(\lambda), I_4(\lambda))^\tau$, the relationship between $I(\lambda)$ and $S(\lambda)$ can be given by:

$$S(\lambda) \propto M_S(\lambda) I(\lambda) \tag{22}$$

where $M_s(\lambda)$ is the synthesis matrix of the PA. The BDC used in the proposed spectropolarimeter design has a wide bandwidth in excess of 100 nm. Thus the synthesis matrix $M_s(\lambda)$ can be practically wavelength insensitive in the spectral range considered in this example and can be written by the following expression, $$M_S(\lambda) = 2\begin{pmatrix} 1 & 0 & 0 & 1 \\ 1 & 0 & 0 & -1 \\ -1 & 0 & 1 & -1 \\ -1 & 2 & 0 & -1 \end{pmatrix} \tag{23}$$

Following the PA circuit, four silicon dual-microring resonator spectrometers (Si-DMRSs) are used to measure the spectra of the intensity channels. Each Si-DMRS consists of an SDMR and a Ge-PD. The MRs in the SDMR have slightly different FSRs. Due to the Vernier effect, the cascaded architecture can achieve a largely extended FSR without using ultra-small MRs that are challenging for fabrication on a wafer scale. The extended FSR of the SDMR is given by, $$FSR = \frac{FSR_1 \cdot FSR_2}{|FSR_1 - FSR_2|} = \frac{\lambda^2}{2\pi|R_1 n_{g2} - R_2 n_{g1}|} \approx \frac{\lambda^2}{2\pi n_{g1}|R_1 - R_2|} \quad (24)$$

where $FSR_{1(2)}$, $D_{1(2)}$, and $n_{g1(2)}$ are the FSR, diameter, and group index of the single MRs, respectively; the subscript 1(2) indicates the first (second) MR. It is noted that $n_{g1} \approx n_{g2}$ when the diameters of the two rings are very close. According to Eq. 6.3, the extended FSR of the SDMR can be increased by decreasing the difference of the diameters. A metal heater is used on the top of each MR to individually vary their temperatures. Tuning the heating powers (HPs) applied to the MRs, the wavelength of each intensity channel, $I_i(\lambda)$, can be continuously swept and then detected by a Ge-PD. As shown in this example, the fabricated silicon photonic chip sits in the centre of a printed circuit board (PCB). Its footprint can be of about ~1×0.6 mm² or smaller. In some embodiments, the chip includes 16 electric I/O ports.

Before experimenting with the full-Stokes spectrometer, a single Si-DMRS integrated with a Ge-PD on the same chip was first characterized. In this specific example, the diameters of two MRs can be 26 µm for the bigger microring and 22 µm for the smaller microring, respectively. A Ge-PD design without doped Ge or Ge-metal contacts was adopted in the polarimeter 2200. Because the germanium lattice is not disturbed by dopants or metal contacts in this example, it can allow for better performance in background loss, bandwidth, and dark current. The Ge-PD was measured to have a responsivity of 1.12 A/W and dark current of ~15 nA at −4 V reverse bias, at 1550 nm wavelength.

FIG. 23 shows a relation between resonance wavelength and heating power on the heaters of larger microring (red dot) and smaller microring (blue square). The centre wavelength as a function of HPs applied to the larger and smaller microrings were calibrated for each channel using a tunable laser. The calibration result is shown in FIG. 23. The tuning efficiency is ~10 mW/nm and ~11 mW/nm for the larger and smaller microrings, respectively. Thanks to the Vernier effect, the maximum HPs required to cover the entire extended FSR for the larger and smaller microrings are only ~70 mW and ~100 mW, respectively. To verify the stability of the polarimeter 2200, several measurements were performed within a week using the same HP calibration. The measurement results show excellent agreement over six day, indicating a very stable operation of the polarimeter 2200.

As shown in FIGS. 24 and 25, the transmission spectrum of the drop port of the fabricated SDMR can have a resonance wavelength near 1561 nm. As best seen in FIG. 24, the 20-dB linewidth can be near 0.9 nm in this example. A bimodal filter shape was designed for a sharper roll-off on its edges to increase the signal-to-noise ratio (SNR). An extended FSR of 50 nm is measured such as shown in FIG. 25.

In an example experiment, the polarimeter 2200 was used to characterize the polarization of a chiral material, i.e., a cholesteric liquid crystal (CLC) slab. It consists of chiral molecules with a mechanical twisting power, which imposes a macroscopic helicoidal self-organization. As a result, the local average orientation of long molecular axis is periodically rotating from layer to layer, forming a natural molecular helix (i.e. "structural chirality"). With a proper choice of the molecular mixture parameters, the CLC slab acts like a spectral resonant filter (e.g., Rocking filter) in a desired spectral range, which only left-handed (or right-handed) circular polarization can pass through. The most complex behavior occurs at the edges of the resonant wavelength range where polarization sensitive reflection and strong polarization rotations (along with strong dispersion) are present. To demonstrate efficacy of the proposed spectropolarimeter, a CLC sample with an edge of the resonant range near 1550 nm was fabricated.

All the four Si-DMRSs were calibrated following the same procedure described in the previous section. The wavelength dependent synthesis matrix of the PA, $M_s(\lambda)$, was also calibrated using four known independent polarization states. Results show the Stokes spectra after the CLC sample with a linear polarization input ($S_1=1$). Excellent agreement is observed in the measurement results between the polarimeter 2200 and a commercial bench-top instrument. The resonant range of the fabricated CLC material was found to be below 1.52 µm. In the resonant range, only left-handed circular polarization can pass through the CLC; $S_3$ evolves towards −1, while $S_1$ and $S_2$ approaches zero as wavelength decreases. While in the non-resonant range (beyond 1.58 µm), the CLC material does not change the input polarization state. Therefore, $S_1$ was found to increase gradually from 0 towards 1 with the wavelength, while $S_3$ increases from −1 to 0 in the non-resonant range.

In spite of compactness, the polarimeter 2200 remains a high performance with a high resolution (1 nm) and broad bandwidth (50 nm) of Stokes spectrum, which, however, has still not reached its limits. For example, according to Eq. 24, a bandwidth of 100 nm can be obtained by increasing the diameter of the larger microring to 24 µm. Besides, the spectral resolution of the polarimeter 2200 can be further proved by another order of magnitude (to 0.1 nm) by decreasing the cross-coupling coefficient between the two microrings without introducing significant loss.

Due to the employment of the Si-DMRS, the energy consumption is significantly reduced. The polarimeter 2200 was found to dissipate near 3.6 J of energy to complete one measurement of the Stokes spectra. Compared to traditional equipment, this value can represent a few orders of magnitude improvement. Moreover, the energy consumption of the polarimeter 2200 can be significantly improved by adding thermal isolation trenches near the MRs (>10 times), and by increasing the sweeping frequency of the HP (>100 times). Due to the limitation of the experimental set-up, the sweeping frequency was only 5 Hz. While the thermal response time of the microring is lower than 4 µs, indicating that a sweeping frequency of 250 kHz is possible. Assuming a higher sweeping frequency of 5 kHz for a larger number of spectral sweeping steps of 1,000 (versus 50 in our current experiment), the total energy consumption of the polarimeter 2200 is estimated to be only ~72 mJ. In this case, one measurement of Stokes spectra can be accomplished within 0.2 s.

Achieving an integrated polarimeter, such as the polarimeter 2200, on a silicon photonic chip paves the way towards fast, affordable full-Stokes spectroscopy. To decrease the cost and size of the device, traditional solutions come with a reduced number of spectroscopic components, and consequently, compromised measurement speed and Stokes spectral resolution. By contrast, the polarimeter 2200 in this example allows for simultaneous achievement of a high speed and a high resolution as all the Si-DMRSs can be integrated on a single chip with little increase in footprint and cost. The polarimeter 2200 is fabricated using industry-standard silicon photonics foundry processes, indicating an easier path towards mass production using established large-wafer manufacturing facilities. The operating frequency range can be readily extended to the visible and mid-infrared regions by using other CMOS-compatible materials (e.g., SiN and Ge) but the same architecture. Leveraging the economies of scale and advantages of silicon PICs integration, the polarimeter 2200 has a vast potential for application in the fields of Internet of Things, pharmaceutical analysis, astronomy, and so on.

The device was fabricated using a commercial CMOS-compatible SOI process with 193 nm deep-UV lithography at IME (now AMF Pte Ltd), Singapore. The devices were subsequently packaged at a laboratory. The electrical connections were realized using Westbond's 7400A Wire Bonder. The plastic cover shell was fabricated using a 3D printer (Ultimaker S5).

Sample Fabrication. The CLC material used was a mixture of commercially available Nematic Liquid Crystal (NLC) 20608 (Qingdao Chemicals) and the chiral molecule CB15 (Merck). Their ratio (75:25 wt % ratio) was adjusted, so that a CLC with selective reflection band in the near IR region could be obtained. The CLC mixture was heated above the clearing point (isotropic phase transition) and filled into the LC cell of 9.6 μm thickness by capillary method and then was slowly cooled down to the room temperature. The cell consists of two indium tin oxide/ITO/ coated transparent glass substrates, which are coated with alignment layers that align CLC molecules parallel to the surface of the substrates.

The calibration of the HPs described in the main text was performed using a tunable laser source (Agilent 81600B) with optical power around 3 dBm. The photocurrents from Ge-PD were read by a Keithley 2612B sourcemeter. The HPs of the heaters were driven using a Keysight E3631A power supply. The light from a high-power wide-band Erbium ASE source (INO) was used to characterize the Si-DMRS. A commercial optical spectrum analyzer (OSA, Yokogawa AQ6370D) was used to measure its spectrum. The synthesis matrix of the pro-posed spectropolarimeter was calibrated by a polarizer (650-2000 nm, Thorlabs), an HWP (1550 nm, Thorlabs), and a quarter-wave plate (QWP, 1550 nm, Thorlabs). Two stepper motor rotators (K10CR1/M, Thorlabs) were used to control separately the angles of the HWP and QWP.

FIG. 26 shows an example of a polarization imager 2600, in accordance with an embodiment. As shown, the polarization imager has a substrate, a plurality of the polarization splitters spaced-apart from one another on the substrate for receiving corresponding spaced-apart incoming light beams. The polarization splitters polarization split each of the incoming light beams into at least a first light beam having a first polarization component and a second light beam having a second polarization component. The polarization imager has interferometry circuits optically coupled to one or more of the polarization splitters. The interferometry circuits make an interference between the first and second light beams to form at least third and fourth polarization components, such as discussed above with the other polarimeter examples. More specifically, in this example, the polarization imager has output waveguides which output the polarization components of the incoming light beams, wherein intensities of said polarization components and interferometry patterns of the interferometry circuits are indicative of the states of polarization of said incoming light beams. As the polarization components fully defining a state of polarization of each of the spaced-apart incoming light beams, a polarization image can be generated on the basis of the intensities of the polarization components.

In this specific example, the polarization imager has a number of polarimeters disposed in an array on the substrate for receiving the incoming light beams. In some embodiments, the polarimeters are similar to the ones described above. As shown, the polarization imager has a plurality of polarization splitters and a plurality of interferometry circuits optically coupled to one another on the substrate. In some embodiments, there can be an equivalent or lesser number of interferometry circuits than of polarization splitters. In the latter case, optical switch(es) may be used to sequentially couple the polarization splitters and the interferometry circuits to one another. As best shown in FIG. 26A, the polarization splitters can be two-way polarization splitters in this embodiment. FIG. 26B further shows that the polarization splitters are surface polarization splitters having an array of cylindrical holes fully etched through silicon. In some embodiments, the interferometry circuits are similar to the ones described above. As shown, the polarization imager has a plurality of detector units coupled to output waveguides incoming from the interferometry circuits for measuring corresponding intensity values from the interferometry circuits. In any case, the polarization imager has a controller determining a state of polarization associated with each of the polarization splitters of the array based on the measured intensity values, and outputting a polarization image based on the determined states of polarization of the incoming light beams.

In this example, the polarization imager can have a compact footprint and thereby achieve a relatively large fill factor. As mentioned, a number of the polarization splitters can share one set of optical interferometry circuit and integrated PDs through on-chip optical switches so that the polarization state received by each SPS can be analyzed in a time series. Each polarization splitter PS connects with bus waveguides through two on-chip optical switches. When the on-chip optical switches of a polarization splitter are turned on, two orthogonal electric field components of the incoming light can propagate from the corresponding polarization splitter to two bus waveguides, respectively. Then, two orthogonal electric field components of the incoming light are injected into the optical interferometry circuit. Measuring the optical intensities of the optical interferometry circuit output ports, the polarization state of the incoming light of the corresponding polarization splitter can be reconstructed. In this example, if these polarization splitters are turned on one by one, a polarization image can be obtained.

In this example, spectroscopic polarimetry is discussed. For instance, principles for channelled spectrum modulator (CSM), which can modulate the Stokes parameters into the channelled spectrum, and on-chip optical spectrum analyzer (OSA) for obtaining the channelled spectrum, are provided.

Figure 27:
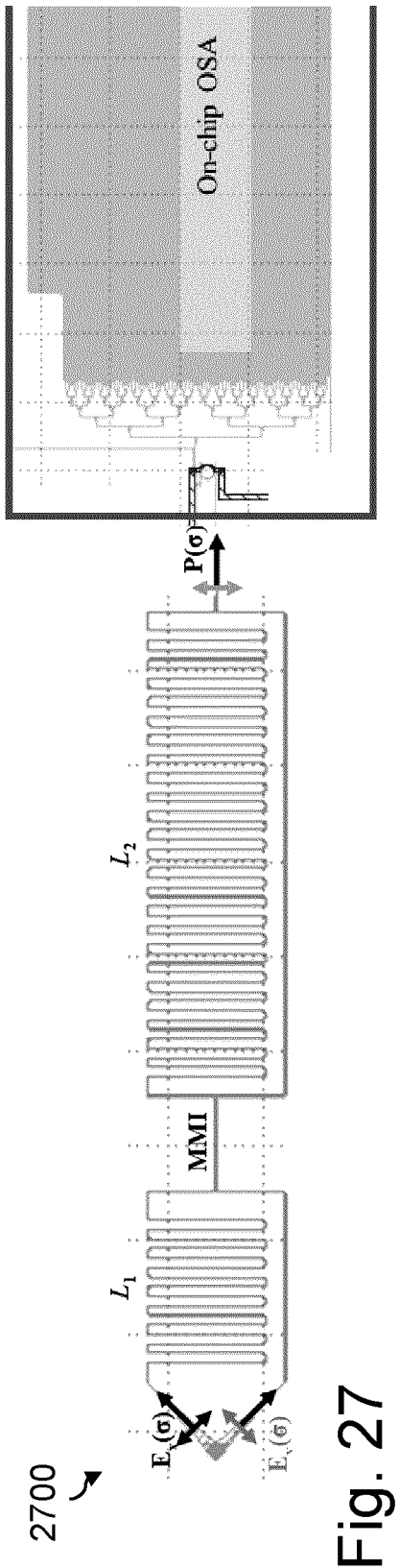
FIG. 27 is a schematic view of another example of a spectropolarimeter, shown with an interferometry circuit incorporating a multimode interferometer and an optical spectrum analyzer, in accordance with one or more embodiments.

FIG. 27 shows another example of a polarimeter 2700, in accordance with another embodiment. As shown, the polarimeter 2700 has a substrate, a polarization splitter, an interferometry circuit and an output waveguide.

More specifically, the polarization splitter receives an incoming light beam having a given state of polarization. The polarization splitter then polarization splits the incoming light beam into at least a first light beam having a first polarization component and a second light beam having a second polarization component.

As shown, the interferometry circuit has first and second phase-retardant waveguides receiving a respective one of said first and second polarization components. A multimode interference coupler is provided to couple the first and second polarization components to one another and then splits the polarization components towards third and fourth phase-retardant waveguides. The interferometry circuit has a multimode coupler which couples the third and fourth phase-retardant waveguides to one another, thereby forming third and fourth polarization components based on interference of the first and second polarization components. As depicted, at least the first and third phase-retardant waveguides are asymmetric with respect to one another. In this way, the polarization components so formed fully determine the state of polarization of the incoming light beam.

In this example, an output waveguide outputs the polarization components towards an optical spectrum analyzer which measures intensities of the polarization components for a plurality of spectral components. As such, upon processing by a controller, a spectrally-resolved state of polarization of the incoming light beam can be determined based on the measured intensities and also on an interferometry pattern of the interferometry circuit, e.g., the phase delays of the respective phase-retardant waveguides.

As shown in this example, the polarization coupler is provided in the form of a surface polarization splitter which split the incoming light beam into two orthogonal polarization components of light. After this splitting, the polarization components pass through an interferometry circuit, e.g., a channelled spectrum modulator (CSM), which can modulate the Stokes parameters into the channelled spectrum. At last, light is fed into an on-chip optical spectrum analyzer (OSA). The channelled spectrum modulator can have a first interferometer element optically coupled to the splitter outputs and leading a first interferometer output, a multimode interferometer optically coupled to the first interferometer output, and a second interferometer optically coupled to the multimode interferometer and leading to a second interferometer output. As can be appreciated, the channelled spectrum modulator can output a modulated light beam comprising the light beams interfering with one another and having spectrally-resolved polarization components.

As shown, the on-chip OSA has a spectrometer circuit which receives the polarization components from the CSM, and redirects the polarization components into a plurality of spectrally spaced-apart channels where each of the spectrally spaced-apart channels has a given spectral component of the polarization components. Accordingly, each of the spaced-apart channels is analyzed to retrieve the spectrally-dependent intensity values. In some embodiments, the on-chip OSA can have a plurality of optical detectors detecting the intensity values in a spatially multiplexed manner. However, in some other embodiments, the on-chip OSA can have a single optical detector detecting the intensity values in a temporally multiplexed manner.

As shown in FIG. 27, for each wave number $\sigma$ (the reciprocal of wavelength $\lambda$), two orthogonal components $(E_x(\sigma)$ and $E_y(\sigma))$ of light will be respectively coupled into two waveguides by the SPS. In the CSM, before and after the light passes through the multimode interference (MMI), if the length differences between up and down paths are $L_1$ and $L_2$, respectively, the electric field $E(\sigma)$ of the light emerging from CSM can be given by:

$$E(\sigma) = \frac{1}{2}\left[\left(E_x(\sigma)e^{i2\pi L_1 n_{eff}(\sigma)\sigma} + E_y(\sigma)e^{i\frac{\pi}{2}}\right)e^{i2\pi L_2 n_{eff}(\sigma)\sigma} + \left(E_x(\sigma)e^{i2\pi L_1 n_{eff}(\sigma)\sigma + i\pi/2} + E_y(\sigma)\right)\right], \quad (25)$$

where $n_{eff}(\sigma)$ denotes the effective index of light with wave number $\sigma$ propagating in the waveguide. The state of polarization (SoP) of light with a broadband spectrum is often described by Stokes parameter $S_0(\sigma)$, $S_1(\sigma)$, $S_2(\sigma)$ and $S_3(\sigma)$. The relation between Stokes parameter and two orthogonal components $(E_x(\sigma)$ and $E_y(\sigma))$ of light can be written by:

$$S_0(\sigma) = |E_x(\sigma)|^2 + |E_y(\sigma)|^2, \quad (26)$$
$$S_1(\sigma) = |E_x(\sigma)|^2 - |E_y(\sigma)|^2,$$
$$S_2(\sigma) = 2\text{Re}\,(E_x(\sigma)\cdot E_y(\sigma)^*),$$
$$S_3(\sigma) = -2\text{Im}\,(E_x(\sigma)\cdot E_y(\sigma)^*),$$

where Re(*) and Im(*) are the real and imaginary components of *. Based on Eqs. (3.1) and (3.2), the channelled spectrum (P($\sigma$)) can be obtained:

$$P(\sigma) = \frac{1}{2}S_0 + \frac{1}{2}S_1\cos(2\pi L_2 n_{eff}(\sigma)\sigma) + \quad (27)$$
$$\frac{1}{4}|S_{23}(\sigma)|\cos(2\pi(L_1 + L_2)n_{eff}(\sigma)\sigma + \arg(S_{23}(\sigma))) +$$
$$\frac{1}{4}|S_{23}(\sigma)|\cos(2\pi(L_1 - L_2)n_{eff}(\sigma)\sigma + \arg(S_{23}(\sigma))),$$

where $S_{23}(\sigma) = S_2(\sigma) - iS_3(\sigma)$. $P(\sigma)$ includes three quasi-consinusoidal components, which carry the information about $S_0(\sigma)$, $S_1(\sigma)$ and $S_{23}(\sigma)$, respectively. Therefore, demodulating the channelled spectrum $P(\sigma)$, SoPs varying with wavelength can be obtained.

Still referring to FIG. 27, the optical spectrum analyzer has a ring-resonator, an optical phase array, and a linear photodiode arrays. Each ring-resonator has a round-trip length L and a self-coupling coefficient τ, respectively. The free spectral range (FSR) of the ring-resonator varies as function of the wavelength $\lambda$ and can be given by:

$$FSR = \frac{\lambda^2}{n_g L} \quad (28)$$

where $n_g$ is the group index. The full width at half maximum (FWHM) of the resonance spectrum can be given by:

$$FWHM = \frac{(1-\tau^2 a)\lambda^2}{\pi n_g L\tau\sqrt{a}}, \quad (29)$$

where a is the single-pass amplitude transmission, including both propagation loss in the ring and loss in the couplers.

Figure 28A:
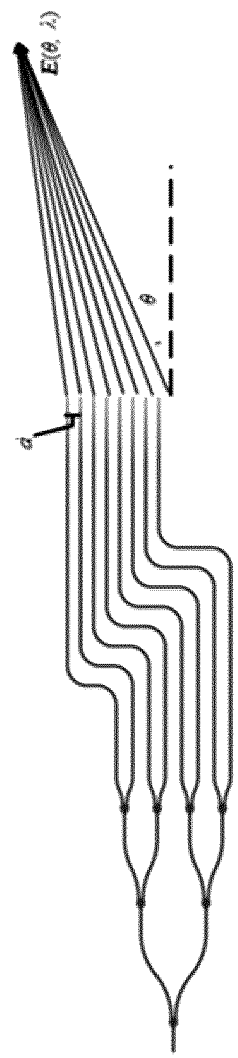
FIG. 28A is a schematic and partial view of an example of the optical spectrum analyzer of FIG. 27, in accordance with one or more embodiments.
Figure 28B:
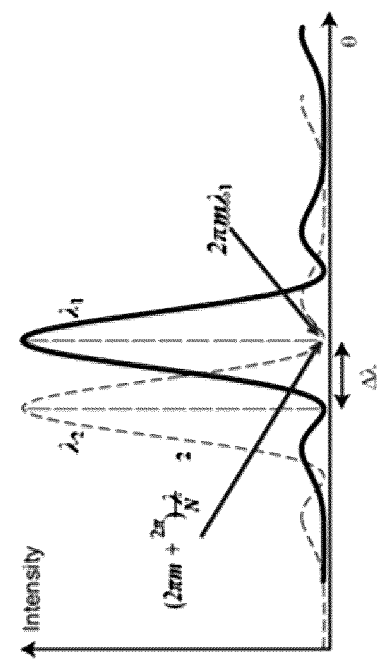
FIG. 28B is a graph showing intensity as a function of wavelength, showing the resolution of the spectropolarimeter of FIG. 27, in accordance with one or more embodiments.

FIG. 28A shows the distance between output paths, as denoted by the letter d. The length of $(1+i)^{th}$ output waveguide is $\Delta L$ longer than that of $i^{th}$ output waveguide. The electric field at the direction of θ can be given by:

$$E(\theta, \lambda) = \frac{1-e^{iN\frac{2\pi d\sin\theta + n_{eff}(\lambda)\Delta L}{\lambda}}}{1-e^{i\frac{2\pi d\sin\theta + n_{eff}(\lambda)\Delta L}{\lambda}}}, \quad (30)$$

where N is the number of output paths. As shown in FIG. 28B, a maximum intensity appears when:

$$2\pi d\sin\theta + n_{eff}(\lambda_1)\Delta L/\lambda_1 = 2\pi m, \quad (31)$$

where m is the order number. And a minimum intensity appears when:

$$N \frac{2\pi d \sin\theta + n_{\mathit{eff}}(\lambda_2)\Delta L}{\lambda_2} = 2\pi mN + 2\pi. \quad (32)$$

Setting $\Delta\lambda = \lambda_1 - \lambda_2$, Eq. (31) minus Eq. (32) can obtain that:

$$\Delta\lambda = \frac{\lambda}{N\left(m - \frac{dn_{\mathit{eff}}}{d\lambda}\Delta L\right)} = \frac{\lambda}{N\left(m - \frac{n_g - n_{\mathit{eff}}}{\lambda}\Delta L\right)}. \quad (33)$$

At the centre (i.e., θ=0), based on Eqs. (31) and (33), the resolution of spectrum can be given by:

$$\Delta\lambda = \frac{\lambda^2}{Nn_g\Delta L}. \quad (34)$$

Eq. (34) indicates that by increasing the period number N and the length difference of path ΔL, one can increase the resolution of the resulting spectroscopic polarimeter. For this spectroscopic polarimeter, the FSR is equal to the resolution of optical phase array spectrometer to achieve a high resolution. Therefore, the resolution of the spectroscopic polarimeter can be determined by the FWHM of the ring resonator.

FIG. 29 shows a flow chart of an example of a method 2900 of performing spectroscopic polarimetry measurements. The method 2900 can be performed by the spectroscopic polarimeters described above.

At step 2902, an incoming light beam having a spectrally varying state of polarization is received.

At step 2904, the incoming light beam is polarization split into a plurality of light beams having respective polarization components.

At step 2906, the light beams are interfered to one another according to an interferometry pattern in which the respective polarization components experience respective temporal delays.

At step 2908, an optical spectrum of the light beam portions is measured such that the optical spectrum has spectrally spaced-apart intensity values. An example of the optical spectrum is shown at FIG. 30A.

At step 2910, the optical spectrum is transformed from a spectral domain representation to a time domain representation, thereby obtaining temporally spaced-apart intensity values showing the polarization components at corresponding temporal delays, such as shown in FIG. 30B. In this step, the transformation can include an inverse Fourier transform. At step 2912, the polarization components are isolated from one another, and then the so-isolated polarization components are transformed from the time domain to the spectral domain, thereby obtaining discrete optical spectra associated to the polarization components, examples of which are shown in FIG. 30C. In this step, the transformation can include a Fourier transform. It is noted that the steps 2910 and 2912 may be optional in some embodiments.

At step 2914, the spectrally varying state of polarization of the incoming light beam is determined based on the interferometry pattern and on the discrete optical spectra.

As can be understood, the examples described above and illustrated are intended to be exemplary only. For instance, the expressions "power splitter" or "power couplers" are meant to be interpreted broadly so as to encompass directional couplers, Y-junctions, multi-mode interferometers (MMI) and any other optical components that can split or couple optical power regardless of its polarization. The scope is indicated by the appended claims.

What is claimed is:

1. A polarimeter comprising:
   a substrate;
   a polarization splitter on said substrate receiving an incoming light beam and polarization splitting said incoming light beam into at least a first light beam having a first polarization component and a second light beam having a second polarization component;
   an interferometry circuit on said substrate having:
      a first power splitter power splitting said first light beam into first and second phase-retardant waveguides, and a second power splitter power splitting said second light beam into third and fourth phase-retardant waveguides being asymmetric with respect to said first and second phase-retardant waveguides;
      a first polarization coupler polarization coupling said first and third phase-retardant waveguides to one another forming a third polarization component, and a second first polarization coupler polarization coupling said second and fourth phase-retardant waveguides to one another forming a fourth polarization component; and
   a plurality of output waveguides outputting said polarization components, wherein intensities of said polarization components and an interferometry pattern of said interferometry circuit are indicative of a state of polarization of the incoming light beam.

2. The polarimeter of claim 1 further comprising first, second, third and fourth detector units on said substrate each receiving a respective one of said polarization components, and generating a respective one of first, second, third and fourth signals indicative of said intensities.

3. The polarimeter of claim 2 wherein said first, second, third and fourth detector units each have a photodetector on the substrate measuring an intensity of a given spectral component of the polarization components.

4. The polarimeter of claim 2 further comprising a controller communicatively coupled to said first, second, third and fourth detector units, said controller having a processor and a memory having stored thereon instructions that when executed by said processor perform the step of: determining the state of polarization of said incoming light beam based on said first, second, third and fourth signals and on said interferometry pattern.

5. The polarimeter of claim 4 wherein said determining comprises determining a plurality of states of polarization each associated to a respective one of a plurality of spectral components of the incoming light beam.

6. The polarimeter of claim 5 wherein said first, second, third and fourth detector units further have an optical spectrum analyzer measuring intensities of the plurality of spectral components of the polarization components.

7. The polarimeter of claim 6 wherein said optical spectrum analyzer has a tunable filter being tunable to direct a given one of said spectral components towards a photodetector measuring an intensity of the selected one of said spectral components.

8. The polarimeter of claim 1 wherein said first, second, third and fourth phase-retardant waveguides have corresponding subwavelength gratings.

9. The polarimeter of claim 1 wherein said first light beam has a first electric field component and said second light beam has a second electric field component orthogonal to said first electric field component, said first, second, third and fourth polarization components being linear combinations of said first and second electric field components.

10. The polarimeter of claim 9 wherein said interferometry pattern is indicative of said linear combinations.

11. The polarimeter of claim 1 wherein said first, second, third and fourth phase-retardants waveguides have a respective one of first, second, third and fourth phase delays $\theta_1$, $\eta_2$, $\theta_3$, and $\theta_4$, at least said first and fourth phase delays $\theta_1$ and $\theta_4$ being different from one another.

12. The polarimeter of claim 11 wherein the intensity $I_1$ of said first polarization component is indicative of an intensity of said first light beam, the intensity $I_2$ of said second polarization component is indicative of an intensity of said second light beam, the intensity $I_3$ denoting an intensity of said third polarization component, and the intensity $I_4$ denoting an intensity of said fourth polarization component.

13. The polarimeter of claim 12 wherein said interferometry pattern is represented by a synthesis matrix $W_1$, wherein said state of polarization S of said incoming light beam is determinable using an equation proportional to the following equation:

$$S = W_1 \cdot I,$$

wherein S is a vector denoting said state of polarization $(S_0, S_1, S_2, S_3)^\tau$ of said incoming light beam, and I is a vector denoting said intensities $(I_1, I_2, I_3, I_4)^\tau$.

14. The polarimeter of claim 13 wherein the synthesis matrix $W_1$ is given by a matrix equivalent to the following matrix:

$$W_1 = \frac{1}{8} \cdot \begin{pmatrix} 1 & 1 & 0 & 0 \\ 1 & 0 & \cos(\theta_1 - \theta_3) & -\sin(\theta_1 - \theta_3) \\ 1 & 0 & \cos(\theta_4 - \theta_2) & \sin(\theta_4 - \theta_2) \\ 1 & -1 & 0 & 0 \end{pmatrix}.$$

15. The polarimeter of claim 1 wherein said polarization splitter has first and second splitter outputs each outputting said first light beam, and third and fourth splitter outputs each outputting said second light beam, one of said first and second splitter outputs being optically coupled to said first power splitter, one of third and fourth splitter outputs being optically coupled to said second power splitter.

16. The polarimeter of claim 1 wherein said interferometry circuit is a first interferometry circuit, said polarimeter further comprising a second interferometry circuit on said substrate forming said first and second polarization components as a linear combination of said first and second light beams.

17. The polarimeter of claim 16 further comprising a first asymmetric power splitter power splitting said first light beam towards said first power splitter of said first interferometry circuit and a first power splitter of said second interferometry circuit, and a second asymmetric power splitter power splitting the second light beam towards said second power splitter of said first interferometry circuit and said second power splitter of said second interferometry circuit, the first and second asymmetric power splitters coupling towards the second interferometry circuit with a coupling factor PR and coupling towards the first interferometry circuit with a complementary coupling factor of PR'=1−PR.

18. The polarimeter of claim 17 wherein said interferometry pattern is represented by a synthesis matrix $W_2$ equivalent to the following matrix:

$$W_2 = \begin{pmatrix} 1 & \frac{\tau-1}{\tau+1} & \frac{2\sqrt{\tau}\cos(\theta'_4 - \theta'_2)}{\tau+1} & \frac{-2\sqrt{\tau}\sin(\theta'_4 - \theta'_2)}{\tau+1} \\ 1 & \frac{\tau-1}{\tau+1} & \frac{2\sqrt{\tau}\cos(\theta'_1 - \theta'_3)}{\tau+1} & \frac{2\sqrt{\tau}\sin(\theta'_1 - \theta'_3)}{\tau+1} \\ 1 & \frac{1-\tau}{\tau+1} & \frac{2\sqrt{\tau}\cos(\theta'_1 - \theta'_3)}{\tau+1} & \frac{-2\sqrt{\tau}\sin(\theta'_1 - \theta'_3)}{\tau+1} \\ 1 & \frac{1-\tau}{\tau+1} & \frac{2\sqrt{\tau}\cos(\theta'_4 - \theta'_2)}{\tau+1} & \frac{2\sqrt{\tau}\sin(\theta'_4 - \theta'_2)}{\tau+1} \end{pmatrix},$$

wherein $\tau$ denotes PR/(1−PR).

19. The polarimeter of claim 1 wherein said first and second power splitters have splitting ratios of about 50%.

20. The polarimeter of claim 1 wherein said output waveguides run along said substrate towards a common area thereof.

21. The polarimeter of claim 1 wherein said polarization splitter is a surface grating.

22. A method of determining a state of polarization of an incoming light beam, the method comprising:
said incoming light beam impinging on a substrate having a polarization splitter;
said polarization splitter polarization splitting said incoming light beam into at least a first light beam having a first polarization component and a second light beam having a second polarization component;
propagating said first and second light beam across an interferometry circuit having waveguides running on said substrate;
said interferometry circuit interfering said first and second light beams to one another in accordance with an interferometry pattern comprising asymmetrically phase-retarding said first and second light beams relative to one another to form third and fourth polarization components, said polarization components fully determining said state of polarization of said incoming light beam;
simultaneously measuring intensities of said polarization components; and
using a controller, determining said state of polarization based on said measured intensities and on said interferometry pattern.

23. The method of claim 20 wherein said first light beam has a first electric field component and said second light beam has a second electric field component orthogonal to said first electric field component, said first, second, third and fourth polarization components being linear combinations of said first and second electric field components.

24. A polarization imager comprising:
a substrate;
a plurality of the polarization splitters spaced-apart from one another on the substrate for receiving corresponding spaced-apart incoming light beams, the polarization splitters polarization splitting a respective one of said plurality of spaced-apart incoming light beams into at least a first light beam having a first polarization component and a second light beam having a second polarization component;
a plurality of interferometry circuits optically coupled to one or more of the polarization splitters, said interferometry circuits interfering the first and second light beams to one another to form at least third and fourth polarization components, the polarization components fully defining a state of polarization of each of said spaced-apart incoming light beams; and a plurality of output waveguides outputting said polarization components of said incoming light beams, wherein intensities of said polarization components and interferometry patterns of said interferometry circuits are indicative of said states of polarization of said incoming light beams.

25. The polarization imager of claim 24 wherein each interferometry circuit has an interferometry circuit on said substrate having: a first power splitter power splitting said first light beam into first and second phase-retardant waveguides, and a second power splitter power splitting said second light beam into third and fourth phase-retardant waveguides being asymmetric with respect to said first and second phase-retardant waveguides; a first polarization coupler polarization coupling said first and third phase-retardant waveguides to one another forming the third polarization component, and a second first polarization coupler polarization coupling said second and fourth phase-retardant waveguides to one another forming the fourth polarization component.

26. The polarization imager of claim 24 further comprising detector units on said substrate each receiving a respective one of said polarization components of said incoming light beams, and generating a respective one of first, second, third and fourth signals indicative of said intensities.

27. The polarization imager of claim 26 further comprising a controller communicatively coupled to said first, second, third and fourth detector units, said controller having a processor and a memory having stored thereon instructions that when executed by said processor perform the step of: determining the states of polarization of said incoming light beams based on said first, second, third and fourth signals and on said interferometry pattern, and generating a polarization image based on said states of polarization.

* * * * *